United States Patent [19]

Pommerening et al.

[11] 3,903,374

[45] Sept. 2, 1975

[54] CONTROL SYSTEM FOR ELECTRONIC PABX SWITCHING MATRIX

[75] Inventors: Uwe A. Pommerening, Webster; Glenn L. Richards, Caledonia, both of N.Y.

[73] Assignee: Stromberg-Carlson Corporation, Rochester, N.Y.

[22] Filed: Jan. 9, 1974

[21] Appl. No.: 431,878

[52] U.S. Cl...... 179/18 GF; 179/18 AD; 179/18 FG

[51] Int. Cl.$^{2}$ .......................................... H04Q 3/52

[58] Field of Search........ 179/18 FG, 18 FF, 18 GF, 179/18 EA, 18 ES, 18 AB, 18 AD

[56] References Cited

UNITED STATES PATENTS

| | | | |
|---|---|---|---|
| 3,618,024 | 11/1971 | Leger et al. | 340/166 R |
| 3,649,767 | 3/1972 | Muroga et al. | 179/18 ES |
| 3,746,797 | 7/1973 | Meise, Jr. et al. | 179/18 D |
| 3,760,361 | 9/1973 | Leger et al. | 340/166 R |
| 3,832,495 | 8/1974 | Hovagimyan et al. | 179/18 GF |

FOREIGN PATENTS OR APPLICATIONS

| | | | |
|---|---|---|---|
| 1,205,470 | 9/1970 | United Kingdom | 179/18 FG |

*Primary Examiner*—Thomas W. Brown
*Attorney, Agent, or Firm*—Donald R. Antonelli; William F. Porter, Jr.

[57] ABSTRACT

In an electronic telephone system having a switching network for connecting line circuits to junctor circuits and other line circuits through selected crosspoints, a matrix control system for controlling the switching network by addressing the crosspoints in sequence in conjunction with the line scanning to ensure that the crosspoints are in their correct state. All junctors associated with a call are also scanned periodically and the crosspoints associated with these junctors and the line circuits connected thereto are scanned at the same time.

18 Claims, 18 Drawing Figures

PATENTED SEP 2 1975 3,903,374

SHEET 2

CONTROL SYSTEM FOR ELECTRONIC PABX SWITCHING MATRIX

The present invention relates in general to telephone systems, and more particularly to a switching system for an electronic private automatic branch exchange.

Continuing efforts are being made in the telephone industry to produce exchange equipment of a more compact structure which is capable of mass production at lower costs, while at the same time providing for increased reliability and speed of operation. Continuous efforts are also being made to provide equipment which is more dependable in operation and less subject to misoperation due to interference, cross-talk and other problems.

Telephone systems typically include switching networks for establishing connection between line circuits or trunk circuits and common control equipment, which networks commonly take the form of a concentrator wherein a plurality of line circuits or trunk circuits is selectively connected over one of a number of possible paths through the network to a lesser number of common control elements. Such concentrator networks have plural switching stages to provide multiple paths between the large number of inputs and the smaller number of outputs. By providing such networks as integrated systems formed of solid state cross points, faster switching times than presently available with electromagnetic switches are accomplished, but the path-finding operations through such networks require rather complicated common control equipment and add to the time required for interconnection of an input to a selected output through the network. Thus, while decrease in the switching time of the network is accomplished by providing such networks as integrated circuits with solid state crosspoints, the equally important considerations of system complexity and optimum switching time are not met to the fullest extent.

The industry has recently experimented with solid-state switching networks, which are considerably more compact and less expensive to manufacture than the presently used electromagnetic switching networks. In this regard, switching networks made up of four layer diode type electronic crosspoints have been developed; however, to date, such networks have proven to be unsatisfactory for a number of reasons, including poor noise performance. Such four layer diode networks typically include "sleeve control" of the cross points by means of a holding current through the network to maintain the communication connection through the crosspoints of the network. Interruption of the "sleeve" due to noise, like in mechanical systems or relay type crosspoint systems, results in a break in the communication connection through the matrix and a consequent loss of the call. In addition, the so-called "rate effect" associated with diode control which results in an inadvertent closing of a crosspoint has become a serious problem with such networks.

As a solution to the numerous problems associated with present solid state switching networks, especially those formed as an integrated network of four layer diode type cross points, there has been disclosed in copending application Ser. No. 232,031, filed Mar. 6, 1972, by Glenn L. Richards, now U.S. Pat. No. 3,789,151, a solid state crosspoint switch made up of a pair of saturated transistors. This solid state crosspoint switch provides a low impedance path through the collector-emitter of the respective switching transistor for passing audio signals between a selected input and output lead pair by driving the two switching transistors associated therewith into saturation from a gated control circuit responsive to appropriate control signals. Such a crosspoint switch has numerous advantages over the conventional four layer diode type crosspoint in that it operates at a higher speed than the diode crosspoint and is not subject to misoperation due to noise or "rate effect" since the switching transistors are positively controlled by gated control signals applied thereto.

It is an object of the present invention to provide a control arrangement for a solid state switching matrix made up of solid state crosspoint switches formed by positively controlled saturated transistors.

BRIEF DESCRIPTION OF THE INVENTION

The present invention will be described in connection with an electronic private automatic branch exchange which is built around a space divided rectangular solid state switching matrix formed of transistor switches, such as disclosed in the above-mentioned U.S. application Ser. No. 232,031 of Glenn L. Richards. One side of the switching matrix provides line appearances which are connected to line circuits, tone receivers, senders and operator loops. The other coordinate side of the matrix provides junctor appearances for connection to an attendant junctor, local junctors and trunk junctors. This solid state switching matrix is a single stage matrix providing direct connection between line appearances and junctor appearances by closing of a single crosspoint, while connection between lines within the system is effected simply by the interconnection of a pair of crosspoints associated with the respective lines and a selected junctor. The details of such a private automatic exchange are disclosed in our copending U.S. application Ser. No. 431,928, filed Jan. 9, 1974, which application is assigned to the same assignee as the present application.

A primary feature of the present invention relates to a control system for constantly controlling the crosspoints in the solid state switching matrix in a positive manner by appropriate control signals under control of the common control to ensure that the crosspoints are closed or open, as required.

The crosspoints are constantly addressed in accordance with the present invention by a line selector in the common control. The common control constantly scans the junctors and the lines and as each line or junctor is addressed, the crosspoints associated therewith are addressed. Addressing of the crosspoints alone results in an automatic release of the crosspoint. However, addressing of the crosspoints with proper control from a matrix control circuit forming part of the common control to indicate that the crosspoints should be closed results in a closing of the crosspoint.

Therefore, in the system of the present invention, due to the line scanner action and the continuous addressing of the crosspoints by the line selector in the common control, crosspoints which are incorrectly closed will be quickly released, while open crosspoints which should be closed will be quickly closed. The scanning times involved are of such a speed that an incorrect state in a crosspoint will be immediately corrected without any noticeable effect upon the communication connections through the matrix.

Because the solid state crosspoint switches are positively controlled into their open and closed states by external control signals, the possibility of loss of a connection through the matrix as a result of noise or transient signals is substantially eliminated. In addition, by continuously scanning the crosspoints associated with each line circuit in conjunction with line scanner operation, a continuous check on the required condition of each crosspoint is effected and any crosspoint which is incorrectly closed will be opened within a few microseconds.

In accordance with the present invention, the crosspoints of the switching matrix are addressed at two distinct times. As already indicated, all of the crosspoints associated with each line circuit designated by the line scanner in the common control are addressed during the time allocated to line scanning operation and those crosspoints which are not to be closed are merely addressed, which effects release of any crosspoints improperly closed.

The crosspoints are also addressed in conjunction with a scanning of the junctors in the system. Each time a junctor is associated with a line circuit, the calling and/or called line circuit identification is stored in a junctor memory. The system scans the data stored in the junctor memory in association with each junctor in turn during a succession of junctor times and during each junctor time the crosspoints of the matrix associated with that junctor and any line circuits associated therewith are addressed. Once again, crosspoints which should be closed are actuated and crosspoints which should be open and merely addressed to force them open if they have improperly closed.

This rapid and continuous scanning of the crosspoints ensures reliable and accurate operation of the switching matrix beyond all standards presently met in the prior art associated with this type of equipment.

In conventional private branch exchanges, whenever a trunk is being switched to the operator, the trunk has a separate operator access and splits the tip and ring leads into tip-ring front and tip-ring rear, while two pairs of tip and ring leads are brought down to the operator loop circuits. Any split functions required by the operator are accomplished in the loop circuits and position circuits of the system. Therefore, the loop circuits and position circuits in such systems are quite complex. However, in the system of the present invention, because of the fast switching capability of the solid state crosspoints of the switching matrix, the split functions in the system are performed with the matrix crosspoints. This makes it possible to design smaller trunk circuits because a separate outlet for access to the operator is not required. The regular trunk outlet, which normally is switched to the line circuits in a trunk-to-line call is also used for switching to the operator.

With the system of the present invention, the operator loop circuits may be provided in the form of line circuits, with the result that switching a trunk to a line or to an operator is essentially the same function as far as the system is concerned. Since loop circuits are basically line circuits, the loop circuitry is therefore relatively simple.

A further primary feature of the present invention relates to the fact that the operator position circuitry in response to the common control accesses the associated junctor in an operator type call. The junctor in turn controls the crosspoints in the switching matrix for the required split functions. Because of this simple operation, the equipment necessary for special trunks, like information trunks, is not required in the system. The junctor performs the information trunk duties without requiring extra equipment. Also, special access trunks for the operator, which are usually quite complex, are not required. The junctor circuit designated as the attendant junctor also takes care of this function.

In addition, due to the elimination of information trunk hardware, tandem operation for operator extended calls to trunks between information trunks and the central office trunks is not required. The operator can be accessed by the line via the local junctor which acts as the information trunk, and when the operator extends the call to a central office trunk, the local junctor is dropped and the central office trunk junctor takes over the duties.

These and other features, objects and advantages of the present invention will become clear from the following detailed description of a preferred embodiment of the present invention presented in connection with the accompanying drawings, wherein:

FIGS. 1*a* and 1*b*, in combination, form a schematic block diagram of the electronic private automatic branch exchange of the present invention;

Figure 4C:
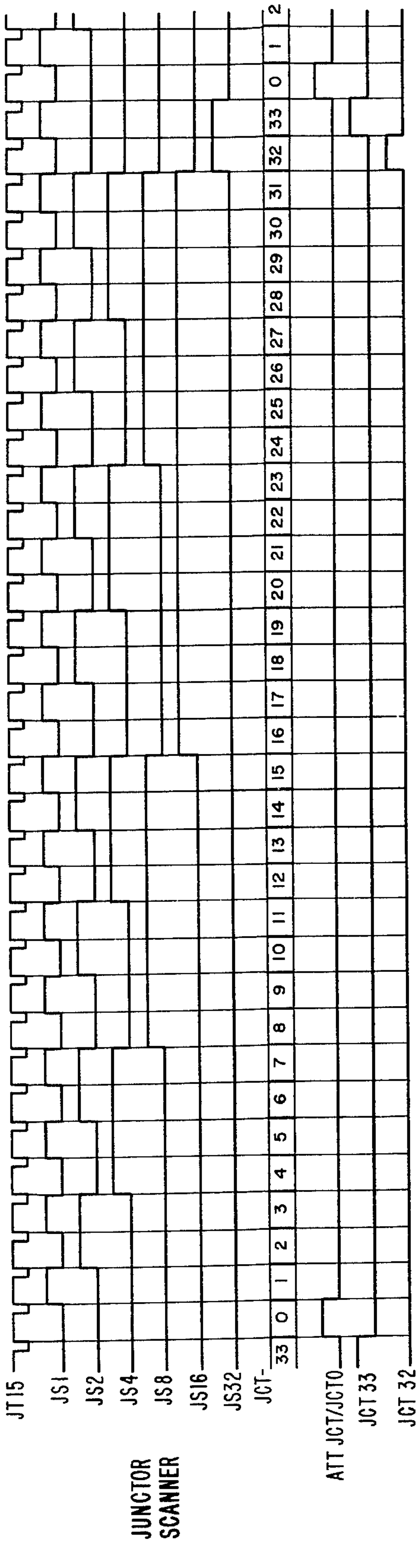
Figure 4A:
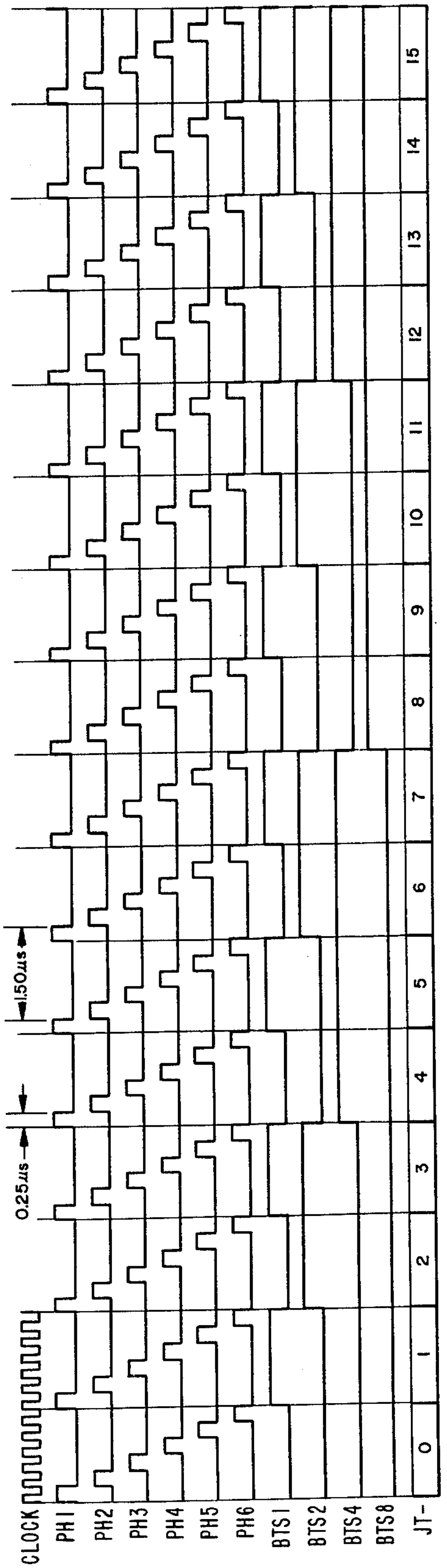
Figure 4B:
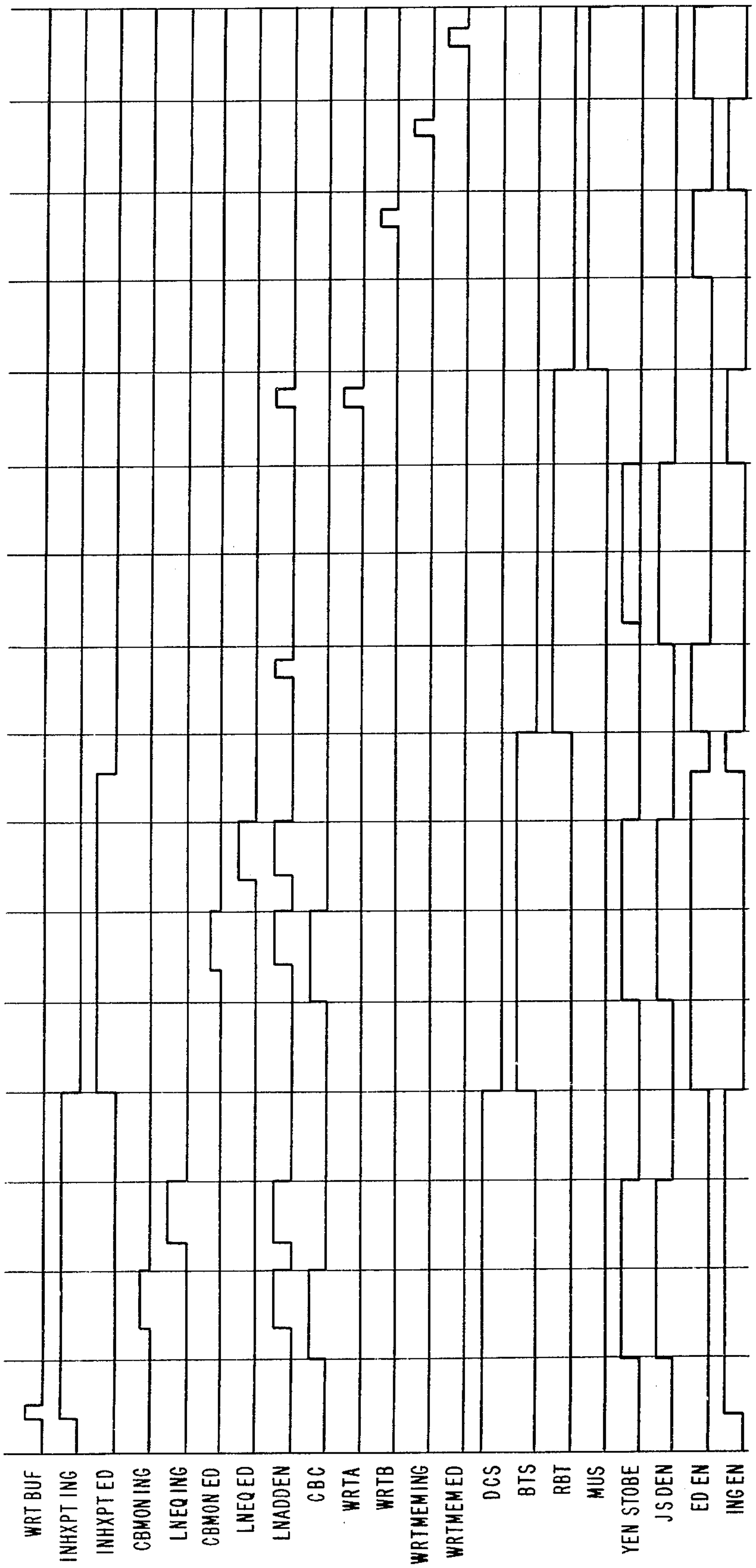
Figure 5:
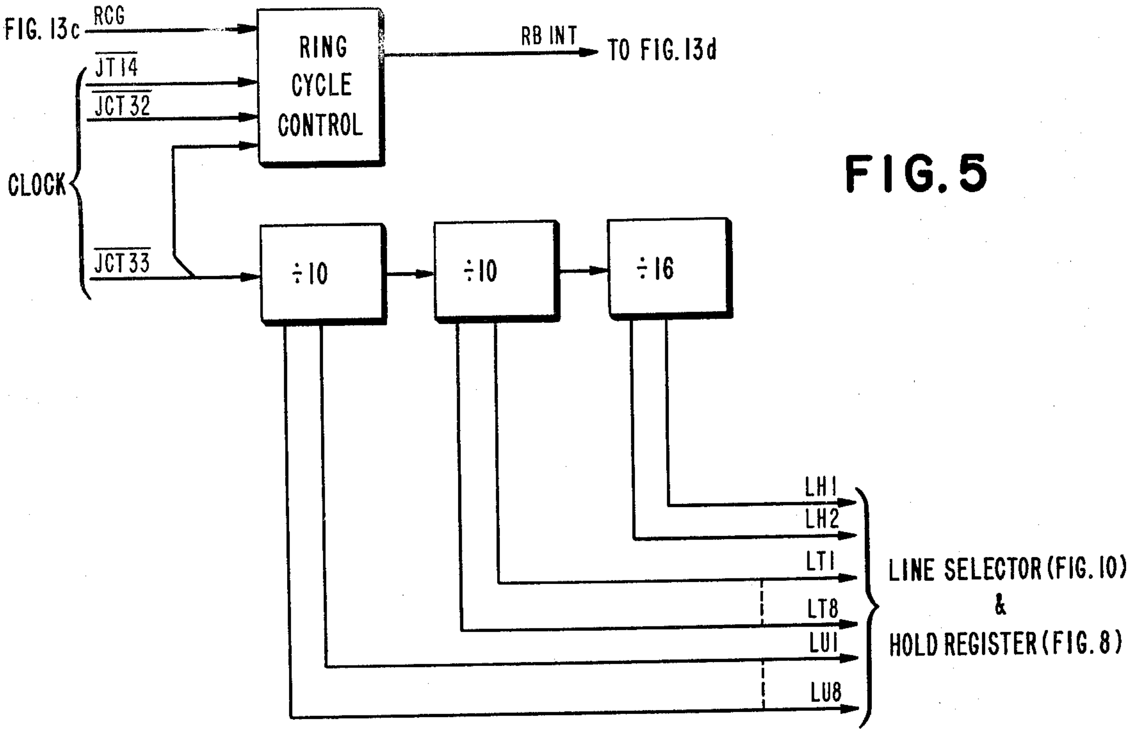
Figure 9:
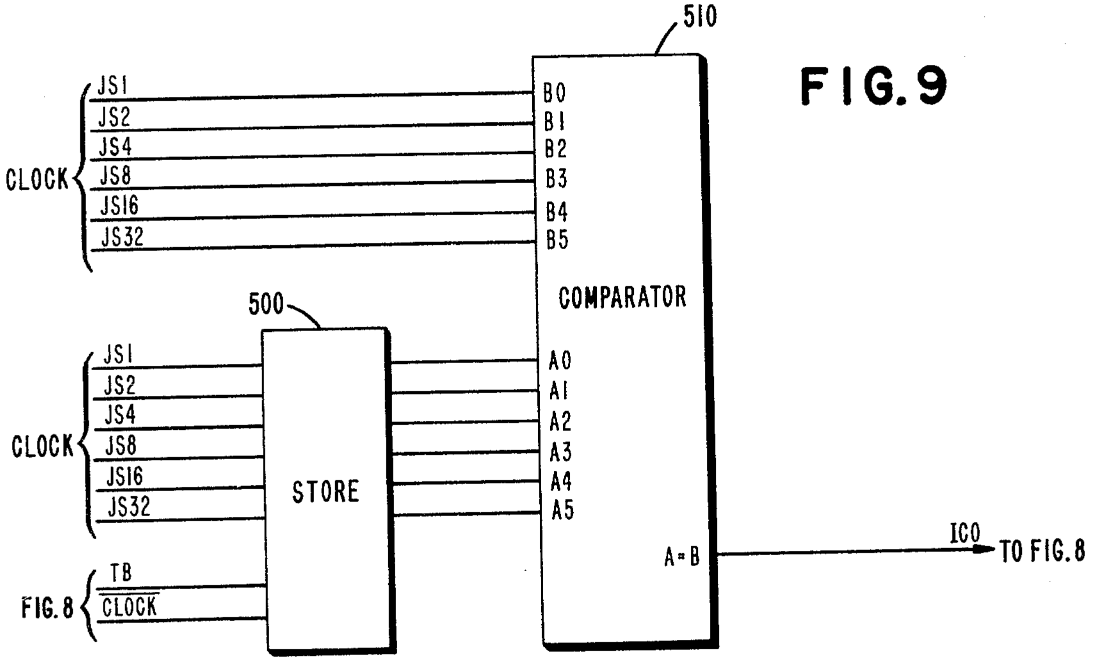
Figure 6:
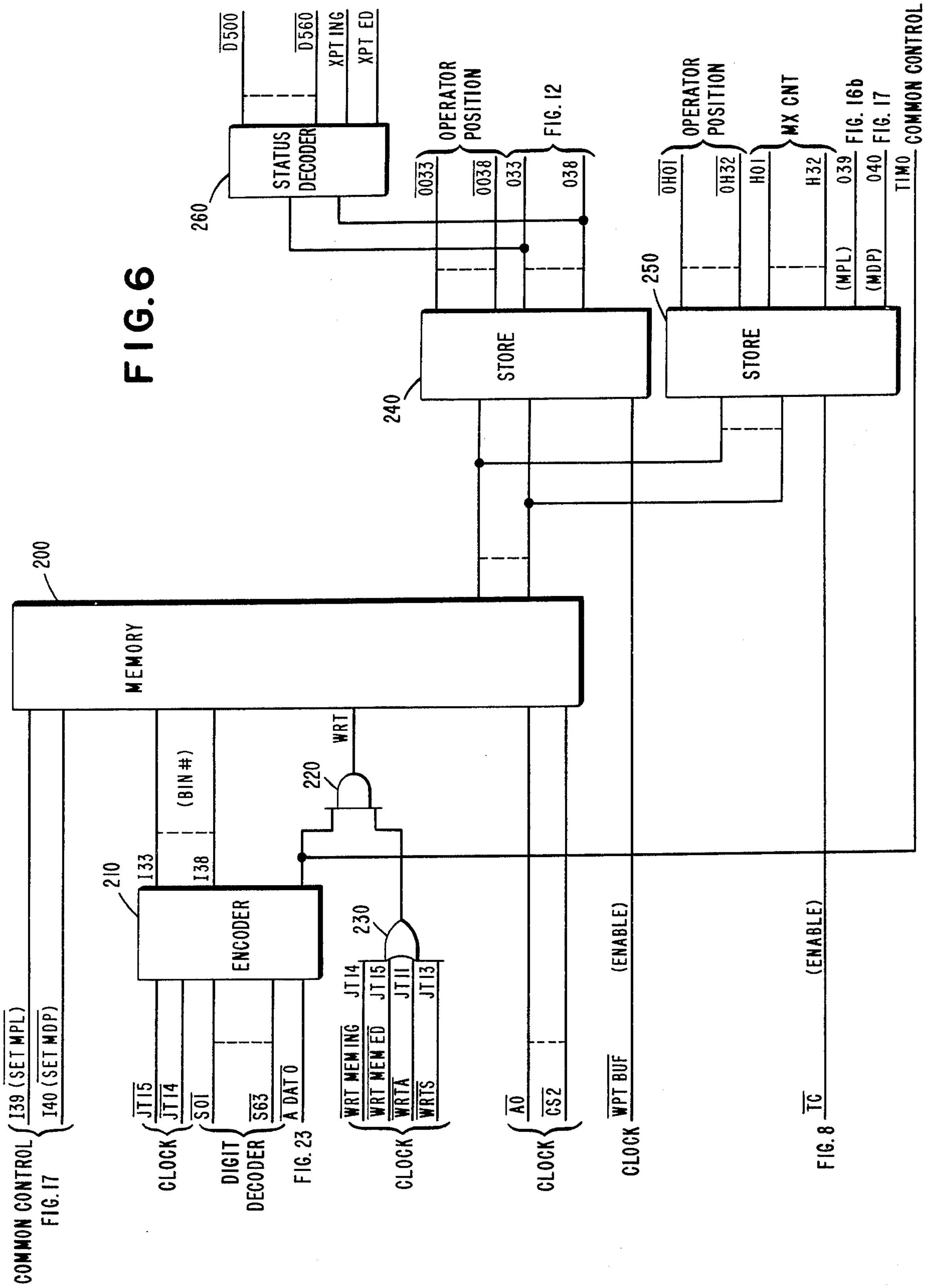
Figure 7:
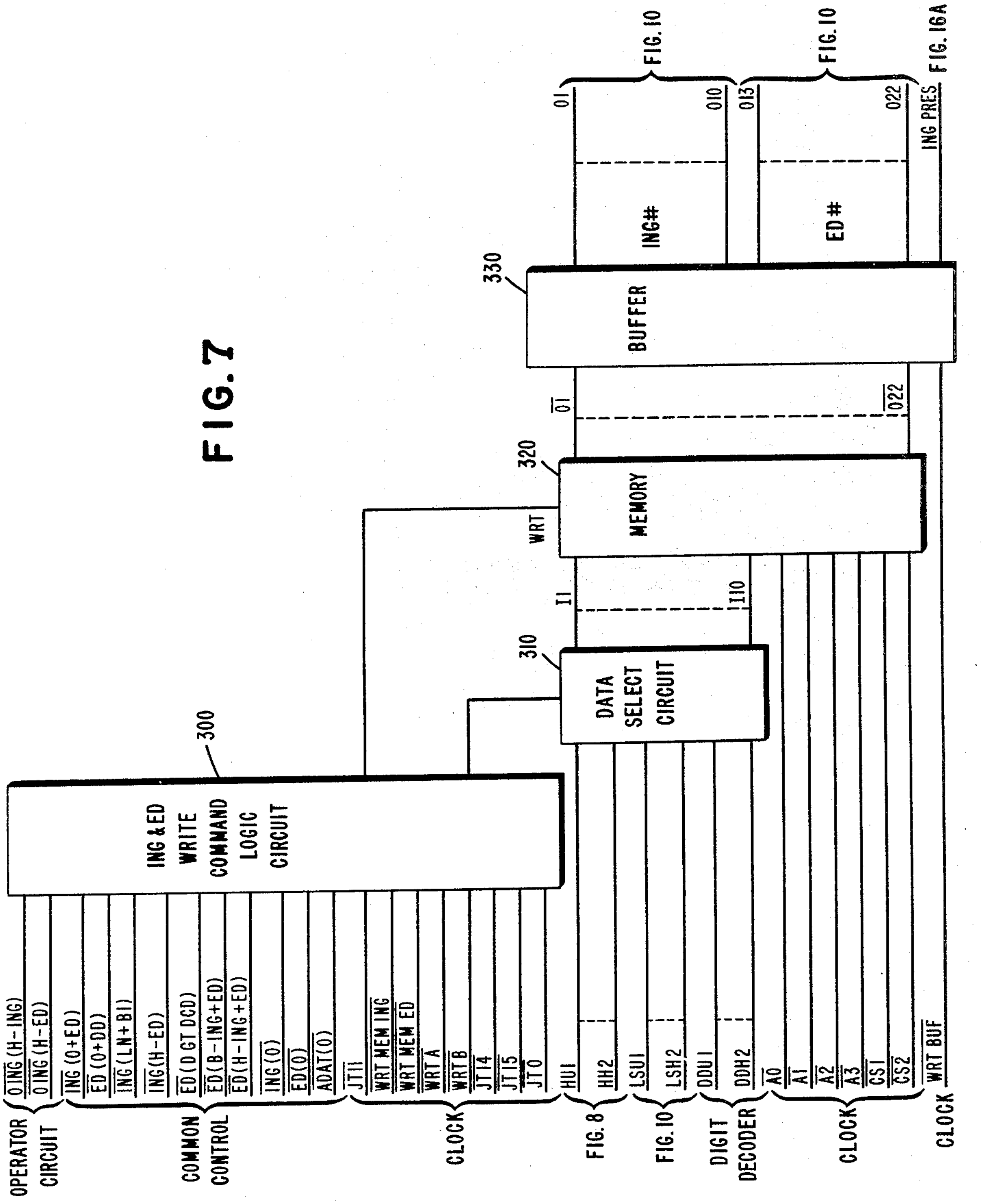
Figure 8:
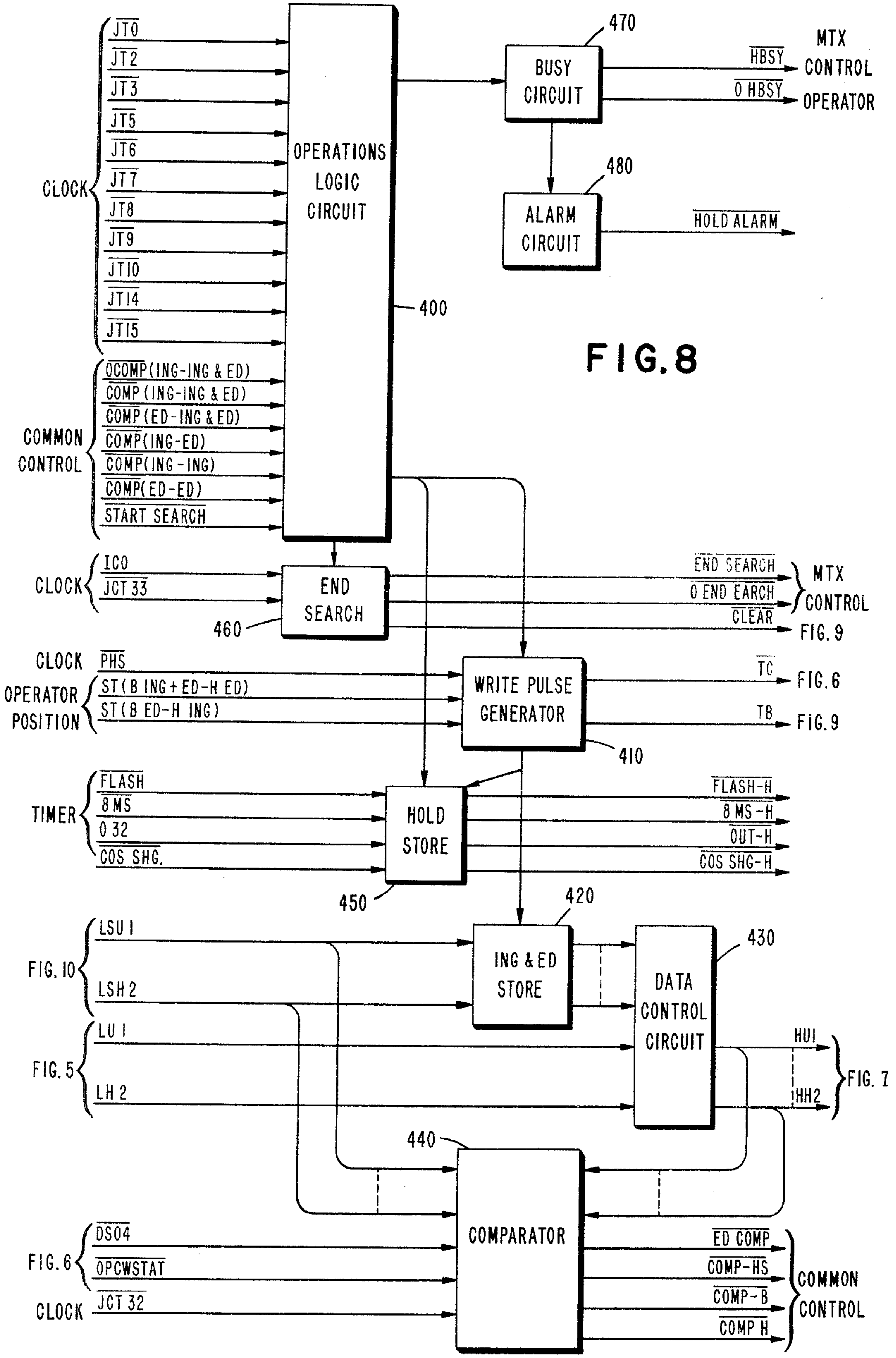
Figure 10:
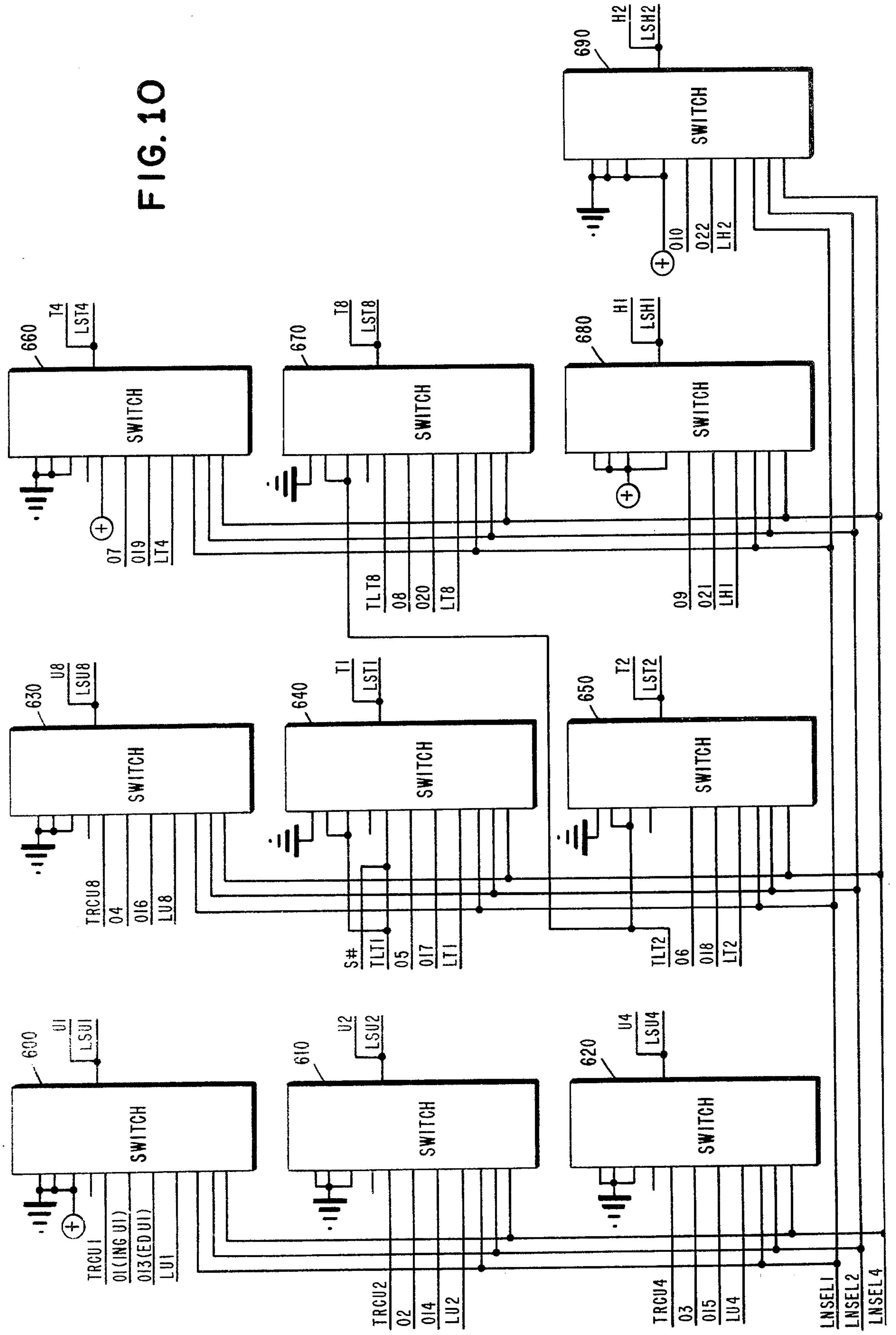
Figure 11:
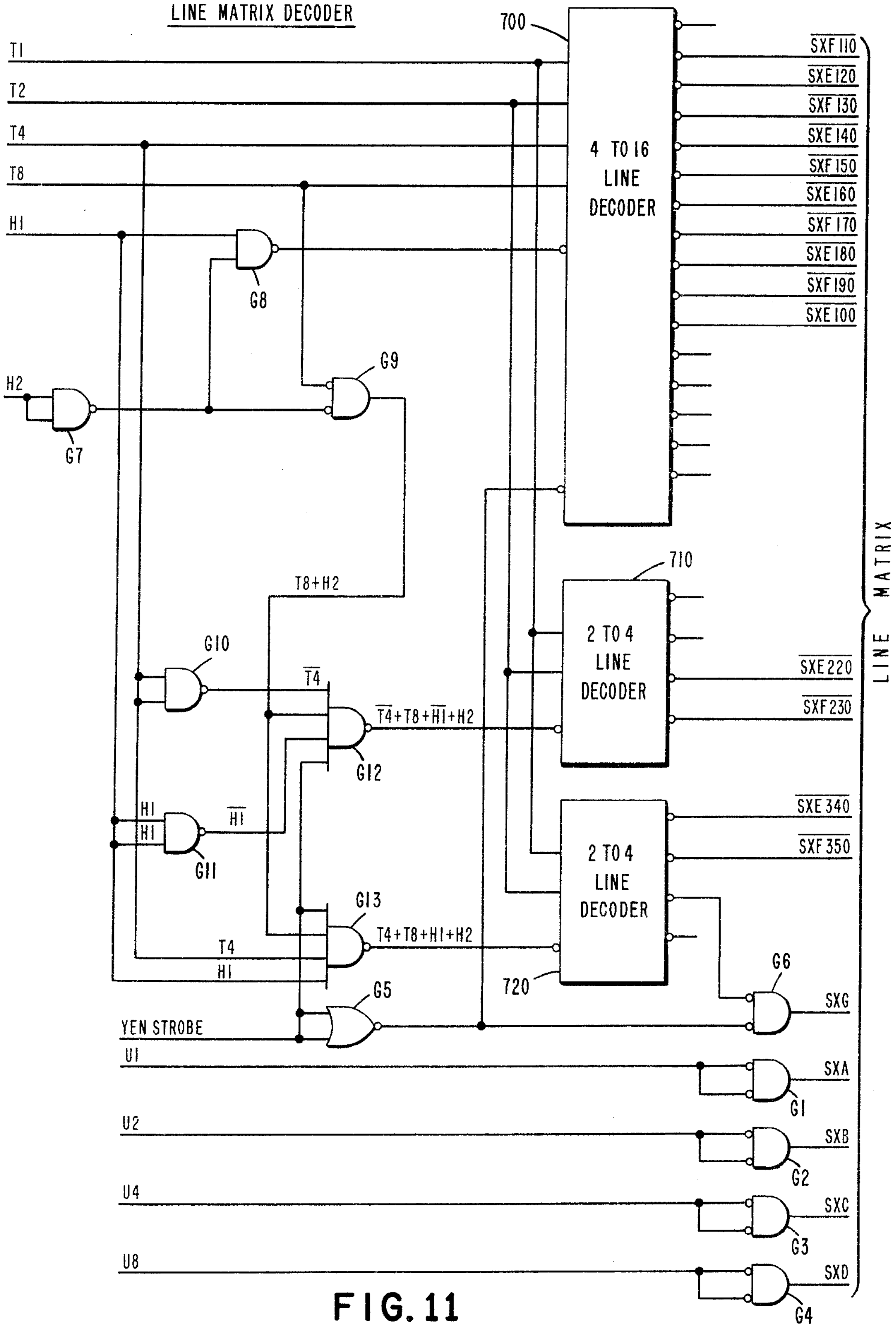
Figure 12:
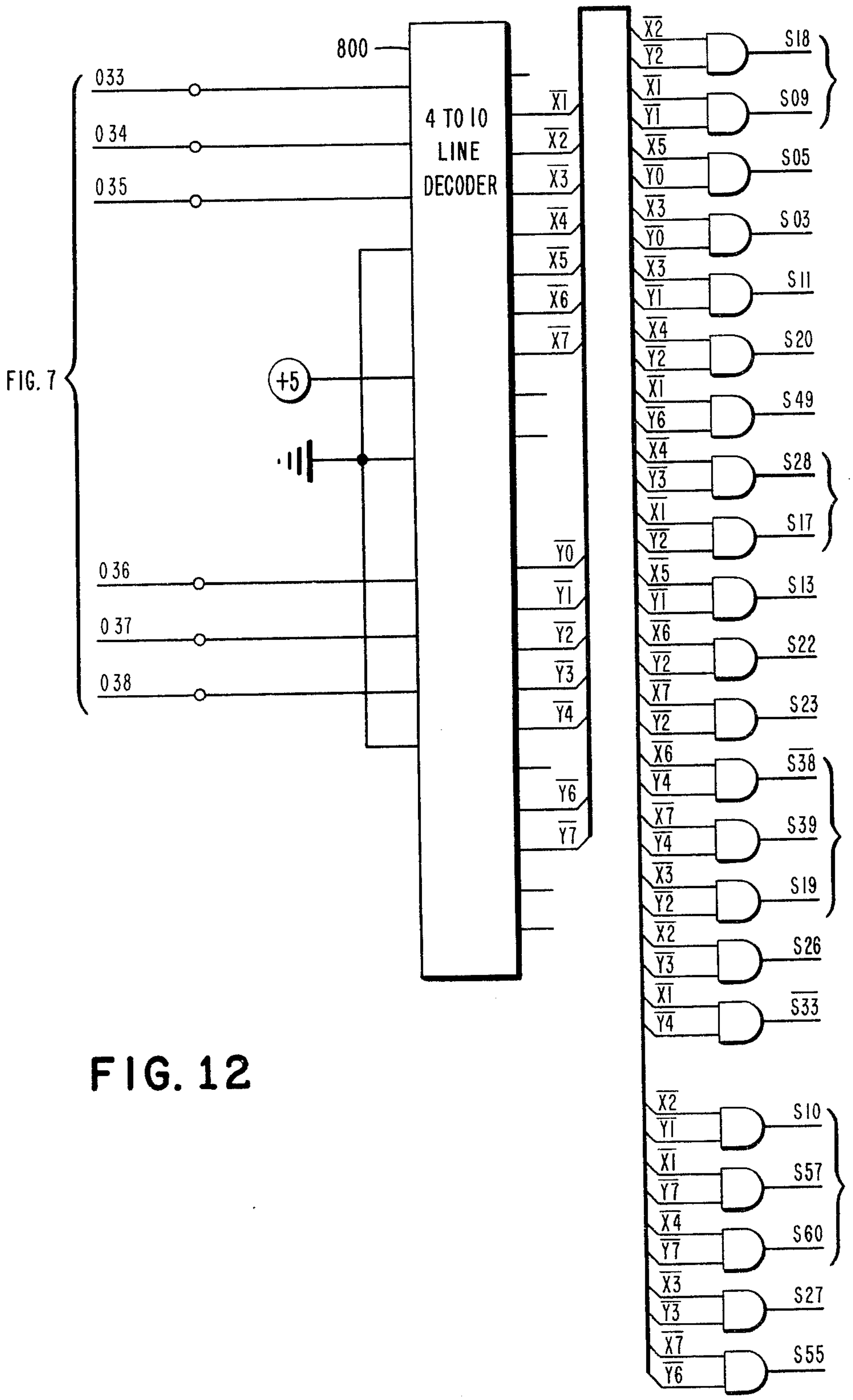
Figure 13A:
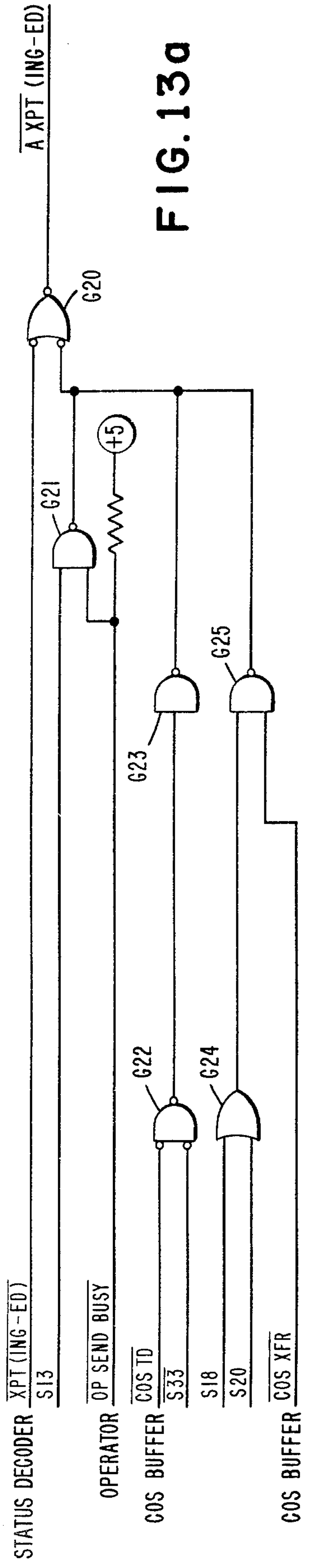
Figure 14:
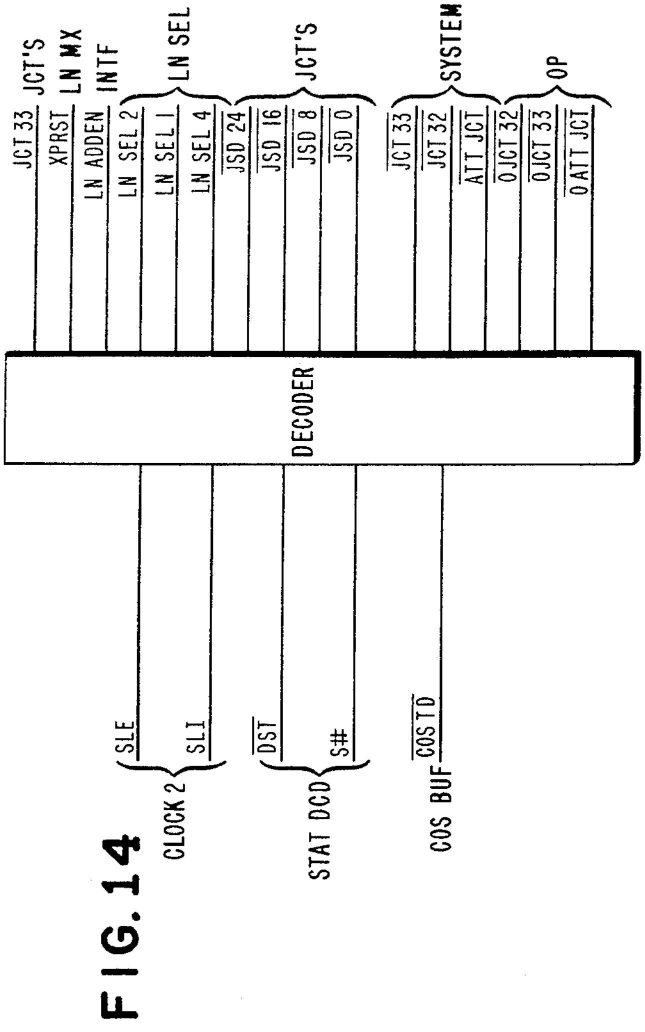
Figure 13B:
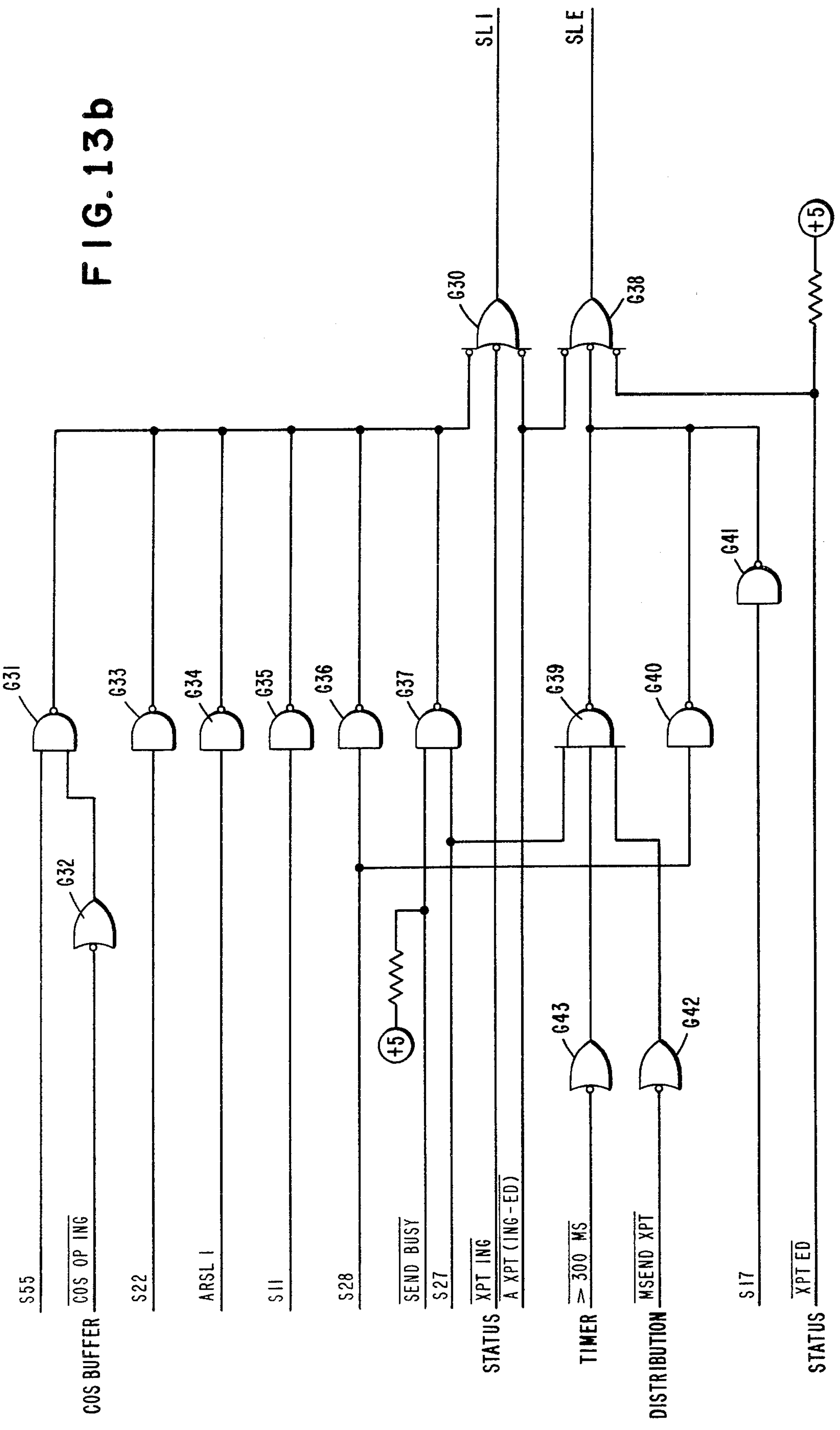

FIGS. 4*A* through 4*C* are waveform diagrams of clock signals which are used to control the timing of functions within the system;

FIG. 5 is a schematic diagram of the line scanner circuit and ring cycle control;

FIG. 6 is a schematic block diagram of the status circuit;

FIG. 7 is a schematic block diagram of the junctor memory;

FIG. 8 is a schematic block diagram of the hold register;

FIG. 9 is a schematic diagram of a circuit providing end-of-search information to the hold register;

FIG. 10 is a schematic diagram of the selector switch portion of the line selector;

FIG. 11 is a schematic diagram of the line matrix decoder portion of the line selector;

FIG. 12 is a schematic diagram of the decoder portion of the matrix control;

FIGS. 13*a* and 13*b* are schematic diagrams of the logic portion of the matrix control applicable to the present invention; and FIG. 14 is a block diagram of a decoder circuit associated with the line selector.

PREFERRED EMBODIMENT OF THE INVENTION

The matrix 10 is a single stage rectangular array of crosspoints divided into three sections, i.e., a line matrix section, a service matrix section and a tone matrix section, as seen in FIG. 1. The matrix serves to establish a low impedance electrical path for passing audio signals between a selelcted one of a plurality of input leads and a selected one of a plurality of output leads.

Line appearances are provided on the left side of the line matrix section, as seen in FIG. 1, including a plurality of line circuits 15*a* through 15*n* through 35*n*. Between the line circuits there are provided connections to special lines which take the place of regular lines in the system. These special lines are dictation access circuits 20*a* through 20*n*, a code call circuit 25 and a plurality of dummy line tie trunks 30*a* through 30*n*. Line appearances at the service matrix section take the form of a plurality of tone receivers 40*a* through 40*n*, a plurality of register senders 45*a* through 45*n*, an intercept recorder 50, a conference bridge 55, a plurality of operator loop circuits 60*a* through 60*n* and an operator line circuit 65. The outputs of the matrix 10 are provided in the form of a plurality of junctor appearances, as seen in FIG. 1. The junctor appearances are associated with an attendant junctor 80, a plurality of conference junctors 90*a* through 90*c*, a plurality of local junctors 95*a* through 95*n*, a plurality of trunk junctors 85*a* through 85*n* and a plurality of tie trunk junctors 86*a* through 86*n*. The trunk junctors 85*a* through 85*n* are connected to corresponding trunks 89*a* through 89*n*, and the tie trunk junctors 86*a* through 86*n* are associated with corresponding tie trunks 87*a* through 87*n*.

The tone matrix section of the matrix 10 provides inputs on respective lines from a combined dial tone generator and busy-camp on tone generator 68, along with inputs from a ring-back tone generator 78 and music source 82. The outputs of the tone matrix section are connected through the respective junctors to the junctor appearances of the line and service matrix sections of the matrix 10.

The operator complex includes in addition to the loop circuits 60*a* through 60*n* and the operator line circuit 65, an operator position circuit 70*a* to which is connected an operator turret 70*b*. A camp on circuit 75 providing a special feature in the system is also connected to the operator position circuit 70*a*. As another special feature of the system, a message metering circuit 18 and one or more peg count meters 17 are associated with the line circuits via a bus 19.

The matrix 10 functions to selectively connect an input from a line to a selected junctor by closing the appropriate crosspoint and to provide an appropriate tone through the selected junctor to the line by closing the appropriate crosspoint in the tone matrix section. Connection from one line to another line is also effected by closing the pair of crosspoints in the line matrix section associated with the respective lines and a common junctor.

Figure 2:
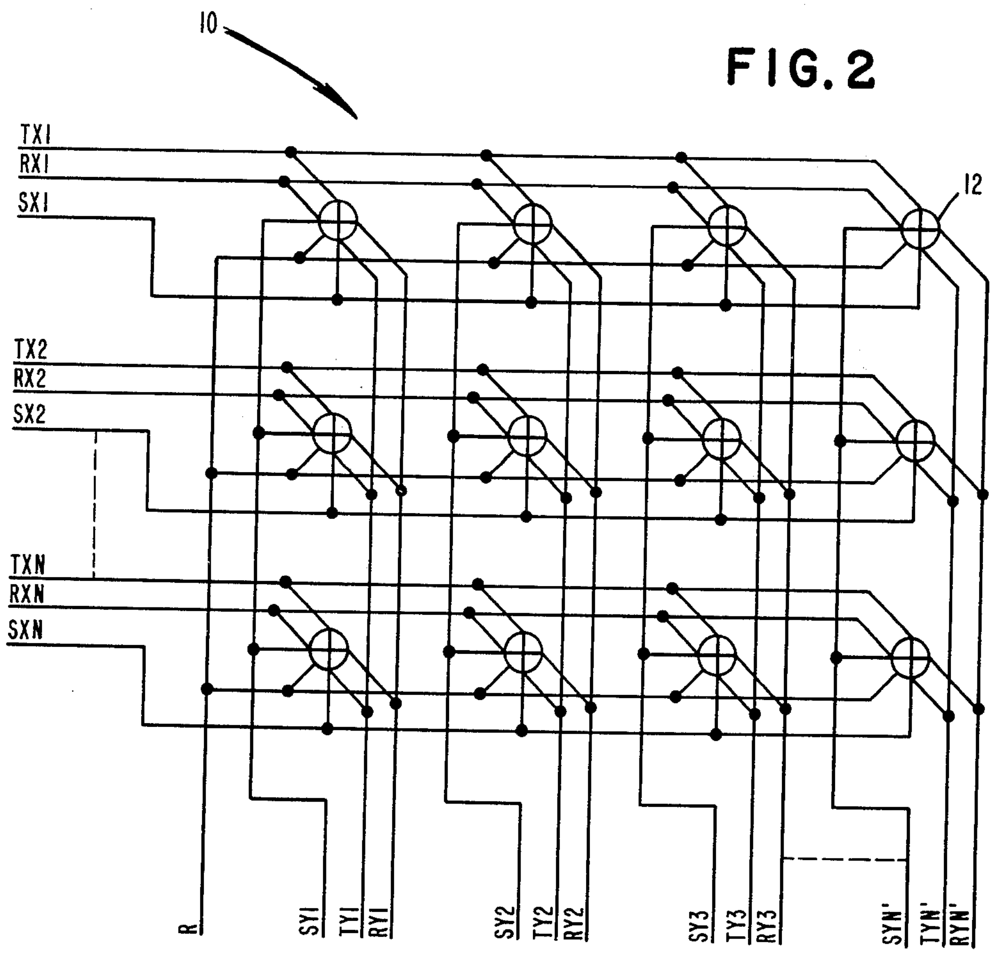
FIG. 2 is a schematic diagram of a portion of a switching matrix utilizing an array of solid state crosspoint switches as provided in the system of FIG. 1.

FIG. 2 provides a detailed illustration of a portion of the matrix 10 made up of an array of solid state crosspoint switches 12 wherein each individual switch 12 interconnects a particular pair of horizontal tip and ring leads TX and RX, respectively, with a particular pair of vertical tip and ring leads TY and RY, respectively. In normal operation, each crosspoint switch 12 provides a high impedance path between the horizontal and vertical pair it interconnects, thereby effectively blocking the passage of any audio signal and d.c. current flow therethrough. When it is desired to pass an audio signal between a particular horizontal lead pair TX and RX and a particular vertical lead pair TY and RY, respectively, the appropriate crosspoint switch 12 is selectively enabled by simultaneously applying appropriate control signals to the control lead R and to a horizontal control lead SX and a vertical control lead SY, which are uniquely associated with that particular crosspoint switch 12 chosen for operation.

Each horizontal lead pair TX and RX has an individual horizontal control lead SX therewith, and each vertical lead pair TY and RY has an individual vertical control lead SY associated therewith. Consequently, any crosspoint switch 12 can be selectively enabled by applying control signals to the horizontal and vertical control leads uniquely associated with the particular switch. Each of the control signals consist of a single momentary pulse which once applied on lead R and on the horizontal and vertical control leads SX and SY, respectively, actuates the switch 12 and is thereafter removed leaving the switch 12 in a low impedance state. When it is desired to restore the high impedance connection, the switch 12 is disabled by applying the same control signals to the same horizontal and vertical control leads SX and SY, respectively, and no signal to lead R.

Figure 3:
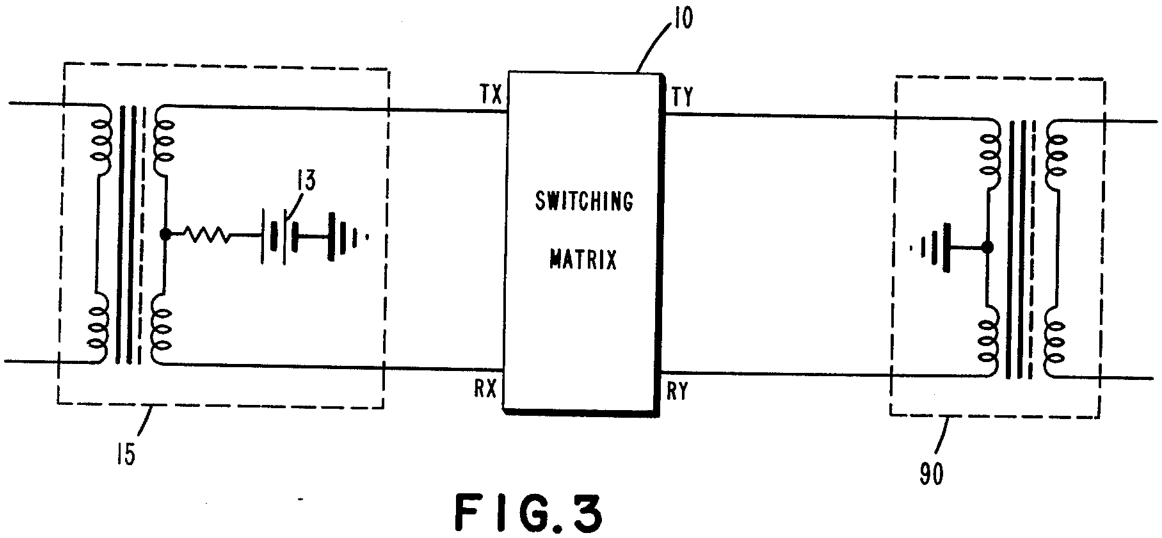
FIG. 3 is a schematic diagram illustrating a single tip and ring line connection to the switching matrix.

The switching matrix 10 is used solely for establishing an audio path between subscribers via the tip and ring leads. The typical tip and ring lead interconnection through the matrix is illustrated in FIG. 3, wherein the tip leads TX and TY and the ring leads RX and RY are interconnected in a single connection including balanced transformer bridges onto which audio signals are transposed. Direct current power is supplied from a battery 13 connected between the center tap of the windings of the transformer bridge in the line circuit 15, for example, and ground connected to the center tap of the transformer in the junctor circuit 90, for example. The basic type of interconnection and biasing arrangement is well known in the art.

As already indicated, the matrix 10 is designed to carry only the audio communication between lines or between a line and a trunk. The signaling associated with the establishment of the communication connection through the matrix 10 is handled outside of the matrix via a common bus 32 through a class of service programmer 47 connected to the common control equipment 100.

Figure 1A:
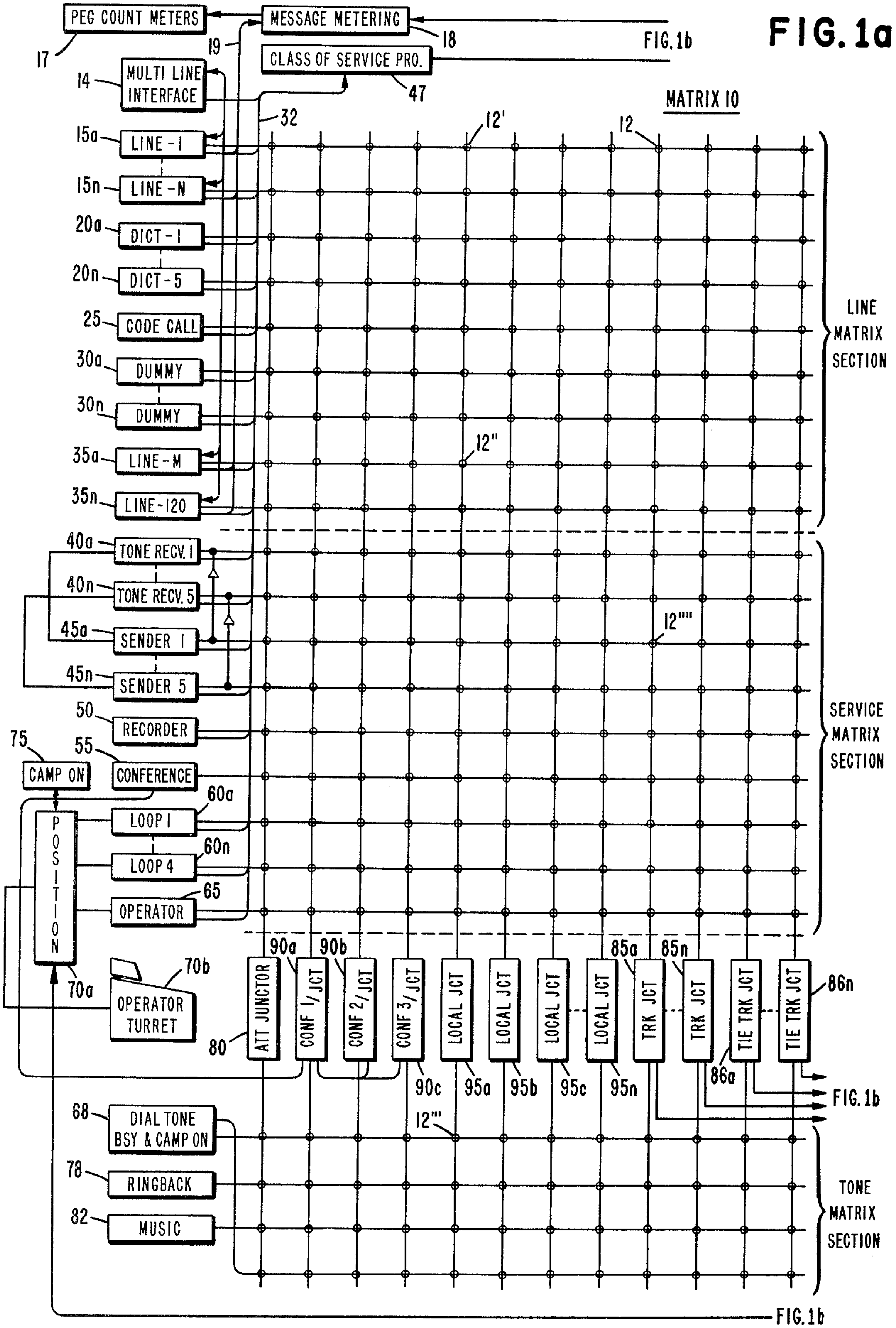
Figure 1B:
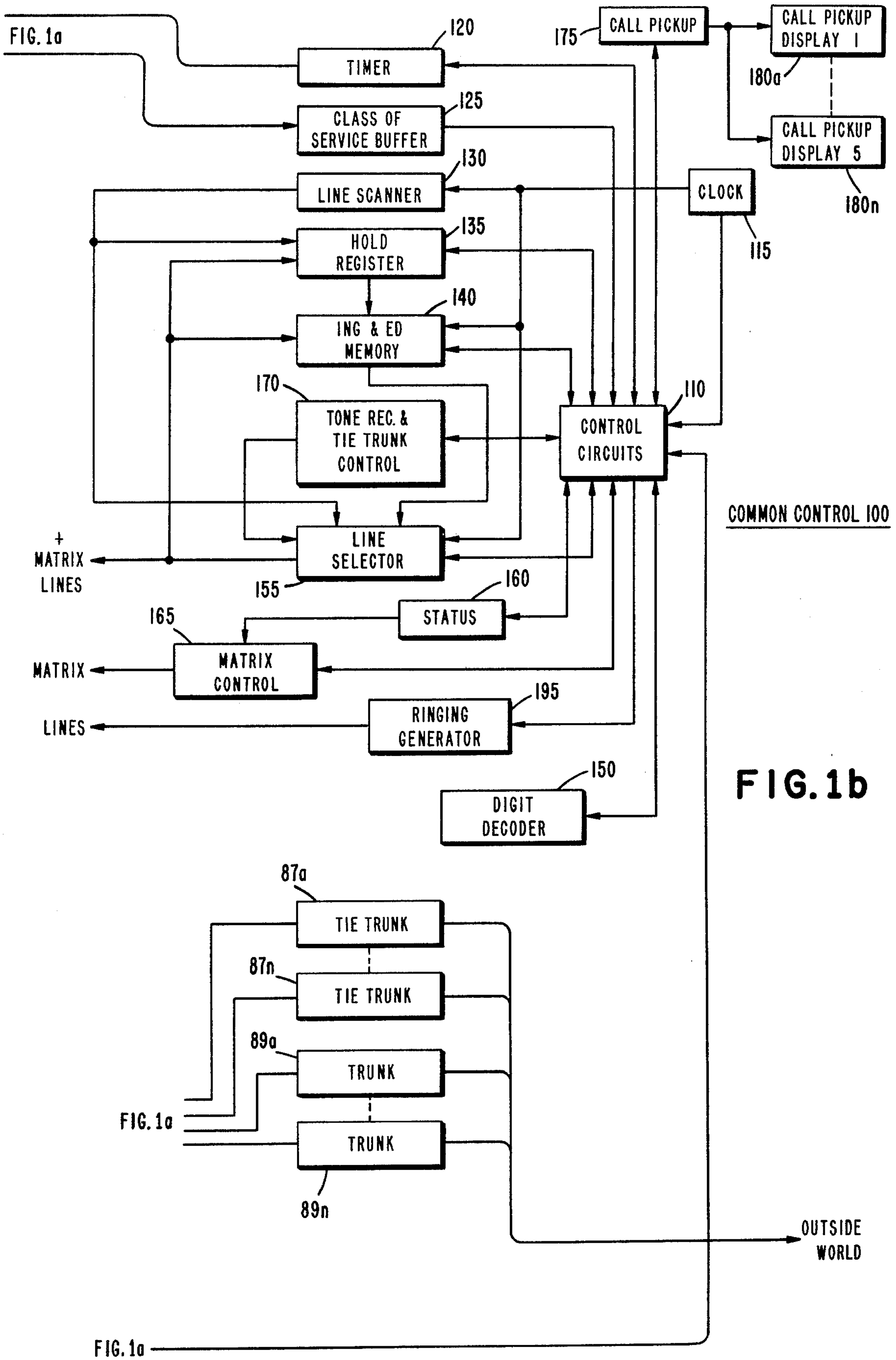

FIG. 1*b* schematically illustrates the various elements of the common control 100, the heart of which is formed by a plurality of control circuits 110 in the form of a hard-wired programmer, as disclosed more fully in copending application Ser. No. 431,928. The timing of the various functions which are performed in the system under control of the control circuits 110 is regulated by the vaious timing signals produced by a clock 115, which is directly connected to the line scanner 130, which serves to generate the line scanning signals, and is connected through the control circuits 110 to the various other elements in the common control 100 to provide a time base for the various functions thereof.

A timer 120 is also provided in the common control 100 to analyze the information concerning line conditions and other information from the junctor and perform memory timing functions within the system. For example, on-hook and off-hook timing, time-outs, flash detection and other conventional timing functions are performed by the timer 120. In this regard, the timer 120 operates with the control circuits 110 to perform whatever timing functions are necessary within the system.

A class of service buffer 125 forms an interface between the class of service programmer 47 and the logic circuitry of the common control 100. Thus, the various line conditions which are derived through the class of service programmer 47 each time a line is addressed will be passed to the control circuits 110 through the class of service buffer 125.

The line scanner 130 is driven from the clock 115 and serves to scan each of the lines in turn continuously to detect requests for service. In this regard, the lines are addressed by the line scanner in conjunction with the scanning of the junctors, a line being addressed from the line scanner at the end of each complete scan of all of the junctors, as will be described in greater detail in connection with line selection and matrix control operation. Each time a line is addressed by the line scanner 130, the calling bridge relay information within the line is forwarded via the common bus 32 and the class of service programmer 47 to the control circuits 110 in the common control 100 via the class of service buffer 125. In this way, the status of the line, i.e., whether or not it is requesting service of the system, is monitored during the continuous scanning of the lines by the line scanner 130.

A hold register 135 is provided as a temporary memory which is used for various systems operations in conjunction with information stored in conjunction with the various junctor circuits. As will be described in greater detail, the system stores the identity of the lines associated with any junctor during the entire duration of a call in the system, so that during the establishment of the communication connection between parties and in providing various functions requested by the parties during the call, it is necessary at various times to temporarily store information as functions are being performed within the system by the common control 100. The hold register 135 provides the temporary storage capability in the system.

The system includes a junctor memory 140 which forms the basic junctor memory portion for storing the calling and called numbers identifying the lines associated with each of the junctors. The memory 140 includes storage positions assigned to each of the junctors, which storage positions are continuously scanned by clock signals derived from the clock 115. Thus, if a junctor is associated with one or more lines, the scanning of the portion of memory 140 assigned to that junctor will produce the calling and/or called numbers of those lines which are stored therein. In this way, the identity of the crosspoints in the matrix 10 associated with the line or lines involved with the junctor can be identified.

In accordance with the present invention, line selector 155 receives line designations from the line scanner 130 and from the junctor memory 140, and in response to clock signals from the clock 115 selectively addresses crosspoints in the matrix 10 and selected lines at the proper times. As already indicated in connection with the description of the solid state crosspoint matrix 10, addressing alone of the crosspoint will open the crosspoint, while addressing in combination with a positive request for actuation of the crosspoint will close the crosspoint. Whether or not the crosspoint is to be opened or closed is determined by the status of the call based upon the progress of the connection as determined by the control circuits 110 from the information derived from the lines via the class of service programmer 47 and class of service buffer 125. The system control progresses in states, with the individual states being monitored by the status circuit 160, which stores the state which any particular call is in and advances under control of the control circuits 110 as the call progresses from one state to the next in a particular program. Thus, the information concerning the desired condition of the crosspoint, i.e., whether it is to be open or closed, is derived from the status circuit 160. If the cross-point which is addressed from the line selector 155 is to be closed for a particular call, a matrix control 165 will receive information from the status circuit 160 to this effect and generate a positive request signal for closing of the crosspoints. If the crosspoints are not to be closed, the matrix control 165 will produce no output as the crosspoints are addressed, thereby effecting an automatic opening of the crosspoints.

A ringing generator 195 of any known form is provided for application of ringing current to the lines under control of the control circuit 110. While the ringing generator is in itself a conventional circuit, the application of ringing to the line in the system of the present invention is somewhat different than known systems in view of the multiplex addressing of the various lines by the common control. Thus, the output of the ringing generator 185 may be connected simultaneously to all lines since the lines are addressed in turn during the scanning of the junctors associated therewith. In this way, the system requires only a single ringing generator, thereby materially simplifying the system in reducing the costs thereof.

The digit decoder 150 performs analysis of the incoming digits and makes decisions concerning these received digits. For example, the digits received by the digit decoder 150 are analyzed for line-to-line calls, line-to-trunk calls, toll restrictions and other information. The information provided by the digit decoder 150 then serves to initiate various control functions within the control circuits 110 as the various states of the call progress.

A call pickup arrangement is also provided including a call pickup circuit 175 and a plurality of call pickup displays 180*a* through 180*n*. In accordance with this special feature, a party may respond to a call to another party identified on the call pickup display.

The function of the various elements of the system and the principles of the present invention will become clear from a general description of various basic functions of the system.

BASIC SYSTEM OPERATION

The lines are continuously scanned from the line scanner 130 via the line selector 155 in the common control 100, so that a line circuit requesting service will ultimately be addressed permitting the state of the calling bridge relay in the line circuit to be passed on through the class of service programmer 47 along with class of service information concerning that line circuit to the common control 100.

Assuming that the line circuit 15*a* has gone off-hook and is requesting service, this line will ultimately be addressed by the line selector when the line scanner 130 reaches this line in its scan of all of the lines. At the same time, the line selector 155 will also address all of the cross-points of the matrix 10 associated with that line circuit. In this case, all of the crosspoints associated with the line circuit 15*a* along the first horizontal of the matrix including the crosspoint 12′ will be addressed. If, as a result of some misoperation, one or more of these crosspoints has been inadvertently closed, the addressing of the crosspoints at this time will automatically open the crosspoints in the absence of positive control from the matrix control 165 indicating that one or more of these crosspoints should be closed. Since the line 15*a* has just requested service, none of the crosspoints should be closed and therefore the status circuit 160 will provide no indication to the matrix control 165 that any of the cross-points involved should be closed. In view of the fast scanning times provided within the system for scanning the lines and junctors, it can be seen that a misoperation of a crosspoint will be immediately corrected so that no effect upon any communication connection through the matrix will result, nor will such crosspoint misoperation be noticeable to either party except for a click as the crosspoint is opened or closed to correct the state thereof.

When the control circuit 110 receives an indication through the class of service buffer 125 that the line circuit 15*a* has requested service, the control circuits 110, which include a junctor allotter, will assign a free junctor to the line circuit and request that the calling line number of the line circuit 15*a* be stored in the junctor memory 140 in the time positioned assigned to the selector junctor. The control circuits 110 will also address the states circuit 160 to record in the memory thereof that the call associated with the selected junctor is in the first state of operation. Assuming that the junctor allotter in the control circuits 110 selects the local junctor 95*a*, the calling line number of the line circuit 15*a* will be stored in the memory position of the junctor memory 140 permanently assigned to the local junctor 95*a*, and each time the junctors are scanned, the line number of the calling line 15*a* will be forwarded to the line selector so that the line 15*a* can be addressed at this time and the crosspoint associated both with the line 15*a* and the junctor 95*a*, i.e., the crosspoint 12′, can be addressed. The status circuit 160 indicates to the matrix control 165 that the call is in a state wherein the crosspoint 12′ should be closed, and therefore the matrix control 165 will forward a positive request for closing the crosspoint 12′ at the time the crosspoint is addressed. As a result, the line circuit 15*a* will be connected through the matrix 10 to the local junctor 95*a*.

At the same time that the crosspoint 12′ is addressed and closed to enable connection between the line circuit 15*a* and the local junctor 95*a*, the matrix control 165 under control of the status circuit 160 addresses the crosspoints of the tone matrix section of the matrix 10 associated with the dial tone generator 68 so that the crosspoint 12′′′ will be closed connecting the dial tone generator 68 through the local junctor 95*a* to the line circuit 15*a*. The line circuit may then commence to dial the number of the party to which it desires connection.

The control circuits 110 in the common control 100 will advance the status circuit 160 for the particular junctor 95*a* to state 2 if the calling line circuit has rotary dial equipment or to state 3 if the calling line circuit has tone dial equipment, as determined from the class of service information for that line circuit received from the class of service programmer 47. Each time the junctor 95*a* is scanned, the number of the calling line circuit 15*a* will be provided by the junctor memory 140 to the line selector 155 which will address the line permitting the calling bridge relay state to be monitored via the bus 32 and class of service programmer 47 in the common control 100. The digit decoder 150 will accumulate the calling bridge relay states and provide to the control circuits 110 the digit information which will be stored in the memory portion of the junctor memory 140 assigned to the junctor. Eventually, the junctor memory 140 will have stored in the portion thereof assigned to the junctor 95*a* both the calling and called line numbers.

When it is determined by the timer 120 that the calling line 15*a* has completed dialing, the control circuits 110 will advance the status circuit 160 to record state 4 in the position of the memory thereof assigned to the junctor 95*a*. State 4 relates to busy test of the called line circuit. If the called line circuit is found to be busy, the tone matrix section of the matrix 10 is once again addressed from the matrix control 165 to connect busy tone from the generator 68 through the local junctor 95*a* to the calling line circuit 15*a*. On the other hand, if the called line circuit is free, the control circuits 110 will advance the status recorded in status circuit 160 to state 5 for application of ringing from the ringing generator 195 to the called line circuit and to address the tone matrix section of the matrix 10 to connect the ring back tone generator 78 through the local junctor 95*a* to the calling line circuit 15*a*. The control over the tone matrix section of the matrix 10 to provide for connection of dial tone, busy tone, ring back tone and music to the lines through selected junctors is described in greater detail in our copending application Ser. No. 431,885, filed Jan. 9, 1974, which application is assigned to the same assignee as the present application.

The matrix control 165, upon receiving the calling and called line numbers from the junctor memory 140 as the junctor 95*a* is scanned, will address the crosspoint 12′ and also the crosspoint associated with the called line, for example, crosspoint 12″ associated with the line 35*a*. Thus, when the called party answers in response to the applied ringing, he will be connected via crosspoint 12′ and 12″ in the matrix 10 to the calling party, and the respective line circuits 35*a* and 15*a* will receive ground to maintain battery, as described in connection with FIG. 3, from the local junctor 95*a* for the duration of the call. At this time, the status circuit 160 is advanced by the control circuits 110 to status 7, indicating to the system that a local call is in progress.

SYSTEM TIMING

The system timing is controlled by the clock 115 in the common control 100 on the basis of various clock signals such as presented in FIGS. 4A through 4C. Typically, a clock includes a 4 MHz crystal oscillator connected to a divider chain and various decoders to produce the required clock signals for controlling the various elements of the system.

As already indicated in the general system description, the junctor memory 140 includes a storage position for each of the junctors in the system and this memory is recirculated so that the information stored in each junctor position is scanned successively during a recurring time frame. In the preferred embodiment disclosed in this application, 32 junctors are connected to the output of the matrix 10, so that the junctor memory 140 will include 32 junctor positions. In addition, the junctor memory 140 also includes positions 32 and 33 which represent time periods during which a scanning of the lines is effected. Thus, after all junctors have been scanned, the line number designated by the line scanner 130 will be addressed during the 32 and 33 junctor positions to determine whether there is a request for service in connection with that line. Thus, at the end of each 32 time position, the line scanner 130 will be advanced to the next line, with the result that the lines are scanned one at a time at the end of each complete scan of the junctors.

Each junctor time position is subdivided into junctor time slots during which the various function required in connection with the call associated with the junctor are performed under control of the common control 100. During one or more of the time slots of each junctor time one or more functions may be performed by various elements of the common control as required by the state of the call under control of the control circuits.

The clock 115 is typically formed by a crystal oscillator connected to a divided chain and various decoders to produce the clock signals required for controlling the functions to be performed within the system. FIG. 4*a* illustrates the output of a 4 MHz crystal oscillator from which phase signals PH1 through PH6 are derived by a clock phase generator producing a division by six of the basic frequency. The output of the clock phase generator is connected to a bit time slot counter effecting a division by sixteen to produce the binary bit time slot signals BTS1 through BTS8. A decoding of the four bit binary time slot signals produces the 16 junctor time slot signals JT0 through JT15.

Further decoding of the binary bit time slot signals BTS1–BTS8 also produces various timing signals which are utilized throughout the system. These timing signals which will be utilized in the various common control circuits to be described are illustrated in FIG. 4B in relation to the sixteen junctor time slot signals JTO through JT 15. The function of these timing signals will be described in connection with the description of the detailed operation of the various common control elements.

FIG. 4C illustrates the waveforms which are derived from the junctor scanner portion of the clock. A further division by 34 produces the junctor scan signals JS1 through JS 32. A decoding of these junctor scan signals then produces the junctor signals JCTO through JCT 33. Additional decoding produces the signal ATT JCT which represents the junctor O position, as well as the junctor 32 and junctor 33 signals JCT32 and JCT 33.

THE STATUS CIRCUIT

The status circuit 160 basically forms a memory including a storage position for each of the junctors to store the state of the call associated with each of the junctors. As already indicated in the general system description, the common control steps progressively through various states during which various operations are performed under control of the control circuits 110 to perform the functions required by the system. To determine what functions need to be performed during each junctor scan, the control circuits 110 determine from the status circuit and the state of the call associated with that junctor. As the functions associated with each state are completed, the control circuits 110 advance the status circuit to the next state for the particular junctor involved so that a continuous record of the state of the call associated with each junctor is maintained within the status circuit.

In the status circuit, the memory 200 includes 32 junctor positions for the junctors JCTO through JCT31 as well as the junctor times JCT32 and JCT33. The status of the cell associated with each junctor is stored in the junctor positions of the memory 200 in binary form, and therefore, an encoder 210 is provided to receive from the control circuits 110 the status signals S01 through S63 and provide the binary equivalents thereof on output lines I33 through I38 to the I38 to the memory 200. Certain of the status signals S01 through S63 are time shared at the input to the encoder 210 under control of the clock signals JT15 and JT14 from the clock 115. A further input to the encoder 210 from the control circuits 110 is the signal A DAT O indicating that all data is to be zeroed, i.e., the status stored in connection with a given junctor is to be 0, for example, when a call has been terminated. The status indications are applied from the encoder 210 to the memory 200 during various time slots by controlling the gate 220 from the output of gate 230. The clock signals WRT MEM ING, WRT MEM ED, WRTA and WRTB generated during the junctor time slots JT14, JT15, JT11 and JT13, respectively, are applied through the gate 230 to enable gate 220 to apply the write signal WRT to the memory 200 permitting the status data from the encoder 210 to be written into the junctor period of the memory. The junctor periods are continuously scanned by the clock signals A0 through CS2 derived from the memory address generator controlled from the clock by the junctor signals JS1 through JS32.

In addition to the binary outputs I33 through I38 from the encoder, the memory 200 also receives direct codes of status I39 and I40 from the control circuits 110. The binary status code is read out of the memory 200 into a pair of buffer stores 240 and 250 under control of the enable signals WRT BUF and TC from the clock and hold register, respectively. The buffer store 240 provides the binary outputs 0033 through 0038 to the operator complex, and the signals 033 through 038 to the control circuits 110 and the matrix control 165. The signals 033 through 038 are also applied to a status decoder 260 which provides a binary to decimal conversion of the signals into status signals DS00 through DS60, which signals are then applied to various elements of the common control to permit various functions to take place during each designated state.

The buffer store 250 is provided for use with the hold register as a hold-over memory portion for hold register searches. The binary status signals OHO1 through OH32 are applied to the operator complex, while the signals HO1 through H32 are applied to the matrix control. The signal 039 and 040, which are direct codes of status, are applied to the control circuits 110.

A time zero signal TIMO is derived from the encoder 210 to indicate to the timer each time a state changes in connection with a given junctor so that the timing functions performed by the timer may be reset to zero.

JUNCTOR MEMORY

The junctor memory 140 includes an ing and ed write command logic circuit 300 which receives various command signals from the control circuits 110 along with junctor time slot signals from the clock and in turn controls the storage and read out of data into and out of a memory 320. The logic circuit 300 receives various command signals for storage of calling and called line numbers in designated locations of each junctor memory portion, which logic signals serve to control a data select circuit 310 receiving line numbers from the hold register on binary inputs HU1 through HH2, from the line selector on binary inputs LSU1 through LSH2, and from the digit decoder on binary inputs DDU1 through DDH2. In accordance with the commands applied to the logic circuit 300, the line numbers from the hold register, line selector, and digit decoder are gated to the memory 320 leads 11 through 110 and stored in the memory 320 upon generation of the write command signal WRT from the logic circuit 300.

The command received from the operator and the control circuits 110 relate to the storing of the calling and called numbers in the proper locations of each junctor portion of the memory. The command $\overline{\text{0ing}}$ (H-ing) indicates that the calling number from the hold register is to be stored in the ing number location of the junctor portion of the memory. Similarly, the command $\overline{\text{0ing}}$ (H-ed) indicates that the called number from the hold register is to be stored in the ing location associated with the attendant junctor. The command $\overline{\text{ing}}$ (0+ed) indicates placing the ed number from the operator in the ing register. The command $\overline{\text{ed}}$ (0+ed) indicates a request to place the ed number from the operator in the called portion of the memory. The command $\overline{\text{ing}}$ (LN + D1) indicates that the line number from the buffer is to be placed in the calling portion of the memory. The command $\overline{\text{ing}}$ (H − ed) indicates that the called number from the hold register is to be placed in the calling portion of the memory. The command $\overline{\text{ed}}$ (DGT DCE) indicates that the number from the digit decoder is to be placed in the called portion of the memory. The command $\overline{\text{ed}}$ (B − ing + ed) indicates that the calling and called line numbers from the buffer are to be inserted in the called portion of the memory. The command $\overline{\text{ed}}$ (H − ing + ed) indicates a request that the calling and called numbers from the hold register are to be placed in the called portion of the memory. The command $\overline{\text{ing}}$ (0) indicates that the number in the calling portion of the memory is to be zeroed. The command $\overline{\text{ed}}$ (0) indicates that the number in the called portion of the memory is to be zeroed. The command $\overline{\text{ADAT (0)}}$ indicates that all data is to be zeroed.

The signals from the clock represent the various junctor time slots during which the various commands are to be executed. The clock also provides the binary signals A0 through A3, CS1 and CS2 which represent the memory addresses of the junctor portion corresponding to the junctor times JCT0 through JCT32. These junctor signals control the circulation of the data within the memory 320 so that incombination with the junctor time slots applied from the clock to the logic circuit 300, the data will be inserted into the proper junctor portion of the memory during the proper time.

The output of the memory 320 is provided on leads $\overline{\text{01}}$ through $\overline{\text{022}}$ to a buffer store 330, which provides binary outputs 01 through 010 representing the calling number and binary outputs 013 through 022 representing the called number to the line selector. A further output ing pres to the control circuit 110 indicates that the calling number is present.

As can be seen, the junctor memory basically provides for a memory storage position for each junctor in the system including a junctor position 32 for receiving the line number from the line scanner which is to be addressed for purposes of determining whether a request for service is present. In each memory portion associated with a particular junctor, the calling and called numbers will be stored depending upon the state of the call so that the system may determine each time a junctor is addressed which line circuits, if any, are involved in a call under the control of that particular junctor.

THE HOLD REGISTER

The hold register 135 serves as temporary memory for calling and called line numbers and other data generated within the common control for use in controlling the functions required in establishing and maintaining a communication connection in the system. The hold register also performs various comparison function between line numbers, for example, in conjunction with busy searches, line scanning and other functions where a particular calling or called line number is to be compared with the calling and called line number stored in the junctor memory.

The functions of the hold register are initiated upon receipt of a comparison request signal or a start search signal from the operator or control circuits 110 in the common control 100. The comparison requests signals and the start search signal are applied to an operations logic circuit 400 along with junctor time slot signals JTO through JT15 from the clock 115. The comparison request commands include the command $\overline{\text{0COMP}}$ (ing − ing and ed) indicating a request for comparison of the ing number from the attendant's junctor with all ing and ed numbers stored in the junctor memory. The command $\overline{\text{COMP}}$ (ing − ing and ed) indicates a request for a comparison of an ing number with all ing and ed numbers of the junctors other than the attendant junctor. The command $\overline{\text{COMP}}$ (ed − ing and ed) indicates a request for comparison of a called number with all calling and called numbers stored in the junctor memory. The command $\overline{\text{COMP}}$ (ing − ed) indicates a request for comparison of a calling number to all called numbers. The command $\overline{\text{COMP}}$ (ing − ing) indicates a request for comparing a calling number to all calling numbers stored in the junctor memory. The command $\overline{\text{COMP}}$ (ed − ed) indicates a request to compare a called number with all numbers stored in the junctor memory.

The various comparison requests are acted upon during various junctor time slots by the operation logic circuit and result in enabling of a write pulse generator 410, which in turn enables a hold store 450 and an ing and ed store 420. The hold store 450 receives various data relating to flashes, time-outs, whether the call is incoming or outgoing call, a designation of the station hunting group, etc., for use by various elements of the common control during the course of the following operations.

The ing and ed store 420 in the hold register stores the calling and/or the called line number associated with a particular junctor as received from the line selector on binary inputs LSU1 through LSH2. For example, if during the time junctor 10 is being scanned the hold register is requesting a comparison of a called number with all of the calling and called numbers stored in the junctor memory, the called number stored in the junctor memory position assigned to junctor 10 will be transferred from the line selector on leads LSU1 through LSH2 to the ing and ed store 420. The numbers stored in the ing and ed store 420 in then applied through the data control circuit 430 to one side of a comparator 440. During the subsequent scanning of the other junctors, the line selector will apply all calling and called line numbers stored in connection with these junctors on binary input lines LSU1 through LSH2 to the other side of the comparator 440. A comparison of the calling numbers stored in the store 420 with all the calling and called numbers stored in the junctor memory is then effected by the comparator 440. Such a comparison, for example, would form part of the busy search where the system attempts to determine whether a called line is busy by scanning all of the junctor positions in the junctor memory to determine whether that line circuit has its number stored in connection with any other junctor. In this case, the status decoder forming part of the status circuit 160 would provide a signal $\overline{DSO4}$ to the comparator 440 enabling the comparison of the numbers stored in the ing and ed store 420 with all numbers received from the line selector.

Other comparisons which are performed within the hold register relate to the scanning of the lines by the line scanner 130. At the end of each junctor 32 time position the line scanner is advanced to the next line and will provide on binary input leads LU1 through LH2 in the hold register the line number which is to be scanned. This line number is applied to the data control circuit 430 which in turn applies it to one side of the comparator 440. During the subsequent scan of the information stored in the junctor memory in connection with the junctors, the comparator 440 will determine whether a comparison exists between the number designated by the line scannner and any number which may be stored in the junctor memory. For example, if a line goes off-hook it might be necessary for the system to determine whether an attempt is at that time being made to complete a call to that line circuit. Since the line scanner steps from one line to the next without knowledge of whether or not a line is already involved in a call, it is necessary for the system to determine before recognizing an off-hook condition from the line as a request for service to determine whether that off-hook condition is a result of a call already established by the system.

The comparator provides various outputs which may be required by the control circuits in the common control for various functions. The output ed-$\overline{COMP}$ indicates that only a comparison of the called number has been detected. The outputs $\overline{COMP\text{-}HS}$ and $\overline{COMP\text{-}H}$ indicates a general comparison detected. The output $\overline{COMP\text{-}B}$ indicates that a comparison of a line with its own number has been detected.

The data control circuit 430 merely serves to multiplex the data which is to be applied to the comparator so as to avoid interference between comparisons associated with data stored in the ing and ed store 420 and comparisons involving the number supplied from the line scanner. The data provided from the data control circuit 430 to the comparator 440 is also supplied to the junctor memory on binary output lines HU1 through HH2.

The write pulse generator 410 is also responsive to control signals from the operator and a signal PH5 from the clock to effect certain shifting of data as required by the system. For example, the signal ST (b ing + ed − H ed) is a request to store the calling and called numbers from the buffer in the junctor memory in the called portion of the ing and ed store of the hold register. The signal ST (b ed − H ing) indicates a request to store the called number from the buffer in the junctor memory in the calling portion of the ing and ed store 420 of the hold register. Such transfers of information from one junctor to the other are necessary for various operations and require a holding of this information between junctor scan times so that the transfer from one junctor position to another junctor position in the junctor memory can be effected. This is accomplished in the ing and ed store 420 under control of the write pulse generator 410. The outputs TB and TC provide indications of the transfer operation.

The hold register also includes and end search circuit 460 connected to the operations logic circuit 400 and receiving the control signal ICO and the clock signal JCT33. The end search circuit 460 merely indicates when a complete scan of all the junctors has been completed. For example, if a search is conducted in the hold register in connection with information stored in junctor 10 position, it is necessary to compare this information with that stored in the junctor positions 11 through 31 and 0 through 9. When the scan once again reaches junctor 10, the end search circuit 460 indicates to the system that the search has been completed. The end search signal $\overline{\text{END SEARCH}}$ and $\overline{\text{0 END SEARCH}}$ are generated along with a $\overline{\text{CLEAR}}$ to effect control of various elements in the common control at the end of the search.

The hold register also includes a busy circuit 470 which is enabled whenever a comparison request or start search signal is applied to the operations logic circuit 400. The hold register performs one function at a time and is automatically made busy whenever a request for a comparison or search is received. When the hold register is busy, the signals $\overline{HBSY}$ and $\overline{\text{0 HBSY}}$ are applied to the matrix control and operator complex, respectively. Since the hold register should not be busy for more than the time needed for one complete scan of all of the junctors, an alarm circuit 480 is provided in association with the busy circuit 470 which times the busy condition recorded by the busy circuit 470 for two complete scans of all of the junctors. If the busy circuit does not indicate the hold register to be free at the end of two complete scans of all of the junctors, an alarm signal $\overline{\text{HOLD ALARM}}$ is generated from the alarm circuit 480.

The circuit which controls the END SEARCH circuit 460 is illustrated in FIG. 9. At the time a search or comparison request is received in the hold register, the write pulse generator 410 will generate a transfer bit signal TB to enable store 500, which receives the junctor designation on leads JS1 through JS32 from the clock 115 at the time of receipt of the transfer bit TB from the write pulse generator 410 in the hold register. Thus, the junctor number at the time of generation of the signal TB is stored in the store 500.

The number which is stored in the store 500 is continuously applied to a comparator 510 along with the clock signals JS1 through JS32. When the original junctor whose number is stored in the store 500 is scanned once again, the comparator will indicate a comparison between the number generated by the clock and that stored in the store 500 and produce the signal ICO to the END SEARCH circuit 460 in the hold register to indicate that the search has been completed. The signal $\overline{\text{CLEAR}}$ from the END SEARCH circuit 460 is then applied to clear the store 500.

THE LINE SELECTOR

The line selector 155 functions to address the lines, including the line circuits, tie trunks and tone receivers, and also addresses the crosspoints in the matrix 10, in response to information received from the junctor memory 140, the line scanner 130 and the tone receiver and tie trunk control 170. While data is received in the line selector from six different sources requiring addressing of the lines or crosspoints of the matrix, the line selector functions in six distinct operations during each junctor scan.

FIG. 10 illustrates the switch portion of the line selector, which includes selector switches 600 through 690. Each selector switch selectively connects one of eight inputs to a single output under control of the binary timing signals LNSEL1, LNSEL2, and LNSEL4 from the clock circuit. Thus, for each of the binary states the clock signals, one of the eight inputs of a selector switch will be connected to the output thereof.

In fact, only five inputs are provided to the switches 600 through 670 and only three inputs are provided to the switches 680 and 690. The five inputs represent data from the five different sources within the common control which requires addressing of the lines or crosspoints. For example, the selector switch 600 receives the signal TRCU1 from the tone receiver control, the signal 01 and 013 representing the units digit of the calling and called numbers, respectively, from the junctor memory 140, TLT1 represents a tens digit from the tie trunk control, and the signal LU1 from the line scanner 130. If the control requires a sender line number, it will make S number high. When S number is low, the switch will deliver the tone receiver line number. These inputs are sequentially connected to the output wherein lead LSU1 is connected to the hold register, junctor memory and the line circuits. The output lead U1 is connected to the line selector decoder portion illustrated in FIG. 11.

During the operation of the line selector the designation of a tone receiver as received from the tone receiver and tie trunk control 170 on leads TRCU1, TRCU2, TRCU4 and TRCU8 are applied to switches 600 through 690 in FIG. 10. The tone receiver designation will be switched to the output of these switches during one phase of the operation of the line selector as determined by the clock signals LNSEL1, LNSEL2 and LNSEL4. During a second operation of the line selector within the same junctor period a calling number received from the junctor memory 140 as inputs 01 through 010 will be connected to the output of the switches 600 through 690. During a third operation within the same junctor period, a called line number from the junctor memory 140 received on leads 013 through 022 will be switched to the output of the switches 600 through 690. During a fourth operation within the same junctor period a line number from the line scanner received on inputs LU1 – LU8, LT1 – LT8, LH1 and LH2 will be switched to the output of the switches 600 through 690. During a fifth operation, the S number input can change to provide the sender line number at the output of the switches 600 through 690. During a sixth operation within the junctor period, a tie trunk designation received from the tone receiver and tie trunk control 170 will be switched on leads TLT1 – TLT8 to the output switches 600 through 690.

Thus, it can be seen that during each junctor period as the junctors are being scanned, the line selector 155 is capable of addressing a tone receiver, a sender, a tie trunk line, ing and ed lines and designated crosspoints in the matrix 10 is six separate operations under control of the clock signals LNSEL1 through LNSEL4. The output signals from the selector switches 600 through 690 on leads LSU1, LSU2, LSU4, LSU8, LST1, LST2, LST4, LST8, LSH1 and LSH2 are applied to the hold register and junctor memory, and these outputs are also applied to the multiline interface 14 to address the individual lines. The outputs U1, U2, U4, U8, T1, T2, T4, T8, H1 and H2 from the selector switches are applied to the line selector decoder illustrated in FIG. 11.

The line selector decoder portion serves to generate address signals for the matrix crosspoints associated with particular lines and junctors. The decoder portion basically consists of line decoders 700, 710 and 720. The binary units designations U1 through U8 received from the selector switches are applied directly through non-inverting AND gates G1 through G4 to the line matrix on output lines SXA through SXD. A clock signal YEN STROBE is applied through gate G5 in control of the line decoder 700 and is also applied through gate G6 along with an output from the line decoder 720 on lead SXG to the line matrix. The line decoder 700 receives the tens binary signals T1 through T8 from the line selector switches and decodes these signals into outputs $\overline{\text{SXF110}}$ through $\overline{\text{SXE100}}$. Various combinations of the tens and hundreds binary designations from the line selector switches are applied through logic gates G7 through G13 to the line decoder 710 and 720 to produce the outputs $\overline{\text{SXE220}}$ through $\overline{\text{SXF350}}$ for control of the line matrix.

MATRIX CONTROL

The matrix contol works in conjunction with the line selector to control the status of the crosspoints in the matrix in connection with all functions in the system. As already described, the line selector responds to information received from the line scanner 130, junctor memory 140 and tone receiver and tie trunk control 170 to address various crosspoints in the matrix 10. As also described in connection with the general description of the matrix, simple addressing of a crosspoint in the matrix drives the crosspoint open in the absence of a request control signal from the matrix control 165 indicating that the crosspoint in question is to be closed. The matrix control receives information from the status circuit 160 concerning the status of the particular call and information from the operator complex concerning the call as well as timing signals from the clock 115 to determine whether a crosspoint should be open or closed.

FIG. 12 illustrates a general decoding arrangement wherein the status of a particular call is received on binary inputs 033 through 038 from the status circuit 160. The decoder 800 decodes the binary indications to provide outputs representing various states during which an addressing of the matrix crosspoints is required.

FIG. 13*a* provides a logic circuitry which serves to generate a request for addressing the calling and called crosspoints in the memory. A direct request for addressing the crosspoints received as a singal XPT (ing-ed) from the status circuit 160 is applied through OR gate G20 as the address request signal $\overline{\text{A XPT}}$ (ing-ed). The same address output is provided during state S13 via AND gate G21 and OR gate G20 in absence of a signal $\overline{\text{OP SEND BUSY}}$ from the operator complex indicating that the operator sender is busy. An output is also provided from OR gate G20 in response to an indication from the class of service buffer 125 that the line has a tone dial class of service indicated by signal COSTD during state S33, which produces an output from gate G22 via gate G23 to the OR gate G20. A further condition providing an output from OR gate G20 results during an indication from the class of service buffer 125 that the line has a transfer class of service, as indicated by the signal $\overline{\text{COS XFR}}$ at the input of AND gate G25 during either states S18 or S20, as indicated by an output from gate G24 to the other input of gate G25.

FIG. 13*b* represents the logic circuitry which serves to generate the control signals SL1 and SLE, which are decoded, as seen in FIG. 14, to produce various control and timing signals including the line selector control signals LNSEL1, LNSEL2 and LNSEL4, the function of which is described in connection with the line selector switches in FIG. 10. The signals also are decoded, as seen in FIG. 14, to produce the signal XPRST, which is the command signal to the crosspoint switches for closing a switch which has been addressed from the line selector.

In FIG. 13*b*, the output SLI is provided at the output of gate G30 under various conditions which serve to enable gates G31, G33, G34, G35, G36 and G37. For example, during state 55 when the class of service buffer indicates that the operator is a calling party via gate G32, gate G31 will be enabled to provide an output from gate G30. The states S22, S11 and S28 also will provide an enabling via gates G33, G35 and G36 of the gate G30. The signal ARSLI from FIG. 13*e* represents a combination of states and trunk conditions which serve to enable gate G34 to provide an output from gate G30. A sender busy signal $\overline{\text{SEND BUSY}}$ applied to gate G37 during state S27 also provides an enabling of the gate G30.

The status circuit, as seen in FIG. 6, provides an instruction for addressing the calling party crosspoint in the matrix by a signal $\overline{\text{XPT ING}}$, which is applied to gate G30 to generate the signal SLI. In conjunction with the addressing of the calling crosspoint, the status circuit also generates a request for addressing the called crosspoint by a signal $\overline{\text{XPT ED}}$ applied to enable gate G38 to produce the signal SLE. The request for addressing the calling and called crosspoints in the matrix derived from the circuitry of FIG. 13*a* is also applied to both the gates G30 and G38 to produce both of the signals SL1 and SLE. The gate G38 is also enabled during state S28 and states S17 via gates G40 and G41. During state S28, when a signal for making the sender crosspoint $\overline{\text{MSEND XPT}}$ is received via gate G42 along with a timing signal $\overline{\text{300 MS}}$ via gate G43, the AND gate G39 will be enabled to enable gate G38 to produce the signal SLE.

The timing in the system as controlled by the clock circuit provides for a scanning of all of the junctor positions in the junctor memory every 800 microseconds so that the crosspoints associated with any line circuit whose identification is stored in the junctor memory in connection with any junctor circuit will be scanned at least every 800 microseconds. In addition, all of the crosspoints associated with the line circuit designated by the line scanner will be addressed during the junctor 33 time of the system scanned, so that regardless of the addressing of the crosspoints in association with the junctor scan, all of the crospoints in the memory will be addressed as a result of the line scanning operation every 300 milliseconds. In this way, the crosspoints are continuously and repetitively scanned at a rapid rate in accordance with the present invention to ensure that the state of the crosspoints is as required.

Using a matrix of solid state transistor crosspoint switches which require positive external control or driving the switch into its open and closed states in conjunction with the control provided by the line selector circuit and matrix control circuit, a switching arrangement is provided which ensures a reliable and accurate interconnection between line circuits through the switching matrix. The correcting of erroneous switch conditions in the switching matrix is effected in an extremely rapid manner without any apparent notice to the subscribers which may be involved in the connection.

Referring now to FIGS. 1*a* and 1*b*, it will be seen that the operator loops 60*a*–60*n* are directly connected to the switching matrix 10 via two-wire tip and ring connections. In conventional telephone exchanges connection from the outside world are typically made to the input port of an incoming trunk via tip and ring lines and the incoming trunk has an output port (including tip and ring lines) to a link line network through which connections are made under the command of the common control to the desired line circuit. The incoming trunks also have forward and rear tip and ring lines for connection of the incoming call to an operator position via an operator service link network (OSLN). When a connection is made to an operator position tip and ring connections are made via the OSLN and, if the operator wishes to speak to an inside party the operator depresses a split key and places a terminating circuit between the tip and ring connections from the OSLN in order to maintain the sleeve connection. The operator then dials the new party and a direct connection between the operator and the dialed line circuit is made via the OSLN and the rear tip and ring leads through the incoming trunk and the output port from the incoming trunk via the line link network. If the incoming call and the newly dialed line circuit are to be connected the operator connects a third port transmission bridge between the operator position and, via the OSLN, the incoming trunk and the line circuit via the connection which has already been established through the input port of the incoming trunk of the line circuit.

The control system of the present invention together with the past switching time of the crosspoint switching utilized in the switching matrix 10, permits such calls to be made via two-wire lines. Thus, when an incoming call is connected via an incoming trunk 89*a* –89*n*, a trunk junctor 85*a*, 85*n*, the matrix 10 and an operator loop 60*a* – 60*n* over a two-wire line to the operator position 70*a*. The operator loop 60*a* –60*n* presents a line appearance to the matrix 10. When the connection has been established, the output of the status decoder 260 is a DS13 ("state 13"). If, on the other hand, a local-local call had been established, the output of the status decoder 260 would be DSO7 or "a state 7" which indicates a local call is in progress. If either a state 13 or a state 7 is present and the common control senses that a line circuit CB relay indicates that the particular line has gone on hook, the common control changes its state either directly to an idle state (state 0) or to a release state ("state 11" or "state 16") and, after the call has been released, to an idle state (state 0).

After the incoming call is from the outside world, a connection has been made to an operator position 70*a*, the operator depresses an exclude source key at the operator turret 70*b* and the common control senses the depressed exclude key and places the incoming trunk 89*a* – *89n* in a "hold" state (state 14). At this point in time the transmission path between the operator position and the incoming trunk is broken by opening a crosspoint switch in matrix 10.

The operator position 70*a* is then connected to an attendant junctor 80, placing the common control in a state 3, and the operator dials the desired local party 15*a*–*15n*. When the connection to the new party has been established, the memory output is state 7. The common control senses the state 7, the exclude mark present on the incoming trunk, 89*a*–89*n*, and the presence of the attendant's number junctor memory in the trunk and, when the operator depresses the exclude key for the second time (in order to remove the incoming trunk 89*a*–89*n* from its hold condition), the common control releases the attendant junctor 80 and causes the trunk junctor 85*a* –85*n* which initially connected the incoming trunk 89*a*–89*n* to the operator position 70*a* to effect a connection to the desired line circuit 15*a*–15*n* dialed by the operator. When the trunk 89*a*–89*n* has been connected to the operator position and the new line circuit 15*a*–*15n* the common control has an output state 22 which causes the matrix control to close the crosspoint switches between the incoming trunk 89*a*–*89n* and both the connected position 70*a* and the line circuit 15*a*–15*n*.

In the case of local calls to the operator position 70*a*, connections to a second local party and three-way conferences between the operator and the two local parties are effected in a similar manner (with an attendant's juctor 80 and a local junctor 95*a*–95*n* performing the necessary switching operations under the control of the common control).

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What we claim is:

1. In an electronic telephone system including a plurality of line circuits, a plurality of junctor circuits and a switching network connected to said line circuits and junctor circuits in the form of a matrix of input lines and output lines interconnected at their crosspoints by respective crosspoint switches which are reset upon application of an addressing signal thereto and set upon application of both an addressing signal and a control signal thereto, matrix control means for controlling said crosspoint switches to selectively connect a line circuit to a junctor circuit and to another line circuit comprising line scanner means for generating sequential line address signals corresponding to said line circuits, and line selector means responsive to said line scanner means for applying addressing signals to all crosspoints switches connected to an input line of said switching network which is connected to a line circuit identified by each line address signal.

2. The system defined in claim 1, wherein said line selector means includes decoder means responsive to each line address signal for generating said crosspoint switch addressing signals corresponding to the particular line address.

3. The system defined in claim 2, wherein said matrix is a solid state matrix of saturated transistor crosspoint switches.

4. The system defined in claim 2, further including junctor memory means having a memory position assigned to each junctor circuit for storing therein line address signals identifying each line circuit to be connected to respective junctor circuit through said switching network, and means for sequentially applying said line address signals stored in said junctor memory means to said line selector means to effect application of addressing signals to the crosspoint switches interconnnecting the input and output lines of the matrix connected to the designated line circuit and junctor circuit.

5. The system defined in claim 4, wherein said line selector means includes selector switch means for selectively applying said line address signals from said line scanner means and said junctor memory means in sequence to said decoder means.

6. The system defined in claim 5, further including crosspoint control means for generating control signals in connection with selected crosspoint switches to set said switches as they are addressed by said line selector means.

7. The system defined in claim 6, further including status means for storing data representing the status of each line circuit connection for the line circuits connected to each junctor and control circuit means responsive to the data stored in said status means for controlling said crosspoint control means to set selected crosspoint switches in said switching network.

8. The system defined in claim 7, further including clock means for controlling said line selector means and said junctor memory means to scan all memory positions of said junctor memory means inbetween each advance of said line scanner means in its generation of line address signals.

9. The system defined in claim 8, wherein said crosspoint control means is responsive to said clock means for generating timing control signals for operating said selector switch means in said line selector means.

10. In an electronic telephone system including a plurality of line circuits, a plurality of junctor circuits and a switching network connected to said line circuits and junctor circuits in the form of a matrix of input lines and output lines interconnected at their crosspoints by respective crosspoint switches which are reset upon application of an addressing signal thereto and set upon application of both an addressing signal and a control signal thereto, matrix control means for controlling said crosspoint switches to selectively connect a line circuit to a junctor circuit and to another line circuit comprising junctor memory means having a memory position assigned to each junctor circuit for storing therein line address signals identifying each line circuit connected to a respective junctor circuit through said switching network, line selector means responsive to line address signals from said junctor memory means for applying addressing signals to the crosspoint switches interconnecting the input and output lines of the matrix connected to the line circuit and junctor circuit designated by the line address signal and the memory position from which it is derived.

11. The system defined in claim 10, further including crosspoint control means for generating control signals in connection with selected crosspoint switches to set said switches as they are addressed by said line selector means.

12. The system defined in claim 11, further including status means for storing data representing the status of each line circuit connection for the line circuits connected to each junctor and control circuit means responsive to the data stored in said status means for controlling said crosspoint control means to set selected crosspoint switches in said switching network.

13. The system defined in claim 12, wherein said line selector means includes decoder means responsive to each line address signal for generating said crosspoint switch addressing signals corresponding to the particular line address.

14. The system defined in claim 12, wherein said matrix is a solid state matrix of saturated transistor crosspoint switches.

15. The system defined in claim 13, further including line scanner means for sequentially generating line address signals corresponding to each of said line circuits, and means for applying said line address signals from said line scanner means to said line selector means for addressing as a group all crosspoint switches connectd to a common input line in the order of the line circuits connected thereto.

16. The system defined in claim 15, wherein said line selector means includes selector switch means for selectively applying said line address signals from said line scanner means and said junctor memory means in sequence to said decoder means.

17. The system defined in claim 16, further including clock means for controlling said line selector means and said junctor memory means to scan all memory positions of said junctor memory means inbetween each advance of said line scanner means in its generation of line address signals.

18. The system defined in claim 17, wherein said crosspoint control means is responsive to said clock means for generating timing control signals for operating said selector switch means in said line selector means.

* * * * *